US006836957B2

(12) United States Patent
Kobayashi

(10) Patent No.: US 6,836,957 B2
(45) Date of Patent: Jan. 4, 2005

(54) METHOD FOR MAKING PERPENDICULAR MAGNETIC RECORDING HEAD HAVING INVERTED TRAPEZOIDAL MAIN MAGNETIC POLE LAYER

(75) Inventor: Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 294 days.

(21) Appl. No.: 10/025,317

(22) Filed: Dec. 18, 2001

(65) Prior Publication Data

US 2002/0078554 A1 Jun. 27, 2002

(30) Foreign Application Priority Data

Dec. 26, 2000 (JP) .......................... 2000-394737

(51) Int. Cl.[7] .......................... G11B 5/127; H04R 31/00
(52) U.S. Cl. .................. 29/603.16; 29/603.07; 29/603.11; 29/603.13; 29/603.15; 360/121; 360/123; 360/126; 427/127; 427/128; 451/5; 451/41
(58) Field of Search ............ 29/603.07, 603.11–603.17; 360/121, 123, 126; 451/5, 41; 427/127, 128

(56) References Cited

U.S. PATENT DOCUMENTS

| | | | | |
|---|---|---|---|---|
| 4,546,398 A | * | 10/1985 | Toda et al. ................. | 360/126 |
| 4,636,897 A | | 1/1987 | Nakamura et al. .......... | 360/119 |
| 4,855,854 A | * | 8/1989 | Wada et al. ................ | 360/126 |
| 4,873,599 A | | 10/1989 | Sueoka ....................... | 360/126 |
| 6,063,512 A | * | 5/2000 | Osaka et al. ............. | 428/694 T |

FOREIGN PATENT DOCUMENTS

| | | | | |
|---|---|---|---|---|
| JP | 01037703 A | * | 2/1989 | .......... G11B/5/127 |
| JP | 8-106613 | | 4/1996 | |
| JP | 10-112008 | | 4/1998 | |
| JP | 10-320720 | | 12/1998 | |
| JP | 2000-48318 | | 2/2000 | |

OTHER PUBLICATIONS

"Interaction between head and recording medium in perpendicular recording"; Hokkyo, J.; Saito, I.; Satake, S.; Magnetics, IEEE Transactions on , vol.: 16 , Issue: 5 , Sep 1980; pp. 887–889.*
"Dynamics of perpendicular recording heads"; Litvinov, D.; Chomko, R.; Wolfson, J.; Svedberg, E.; Bain, J.; Bain, J.; White, R.; Chantre R.; Khizroev, S.; Magnetics, IEEE Transactions on, vol.: 37 , Issue: 4 , Jul. 2001; pp. 1376–1378.*
Japanese Office action dated Aug. 6, 2004 for Japanese Patent Application No. 394737.

* cited by examiner

Primary Examiner—A. Dexter Tugbang
Assistant Examiner—Paul D Kim
(74) Attorney, Agent, or Firm—Brinks Hofer Gilson & Lione

(57) ABSTRACT

A perpendicular magnetic recording head includes a main magnetic pole layer having an inverted trapezoidal cross-section at the face opposing a recording medium. The main magnetic pole layer is formed by plating in a groove which is formed in a resist layer. The width of the resist layer in the track width direction gradually increases from the bottom to the top of the resist layer. This tapered groove is formed by annealing a nontapered groove or controlling the patterning precision of the resist layer. The inverted trapezoidal main magnetic pole layer prevents side fringing when the perpendicular magnetic recording head has a skew angle.

9 Claims, 17 Drawing Sheets

METHOD FOR MAKING PERPENDICULAR MAGNETIC RECORDING HEAD HAVING INVERTED TRAPEZOIDAL MAIN MAGNETIC POLE LAYER

BACKGROUND OF THE INVENTION

1. Field of the Invention

The present invention relates to a method for making a perpendicular magnetic recording head which performs recording on recording media such as a disk having a hard layer by a perpendicular magnetic field. In particular, the present invention relates to a method for making a perpendicular magnetic recording head which suppresses fringing of a recorded pattern and is suitable for high-density recording.

2. Description of the Related Art

Perpendicular magnetic recording writes high-density magnetic data on a recording medium such as a disk. FIG. 32 is a cross-sectional view of a typical known perpendicular magnetic recording head H, which is used in apparatuses of a perpendicular magnetic recording type.

The perpendicular magnetic recording head H is provided at the trailing side 1a of a slider 1 which floats and moves on or slides on a recording medium Md. The perpendicular magnetic recording head H is disposed between a nonmagnetic layer 2 and a nonmagnetic coating layer 3 at the trailing side 1a.

The perpendicular magnetic recording head H includes an auxiliary magnetic pole layer 4 composed of a ferromagnetic material and a main magnetic pole layer 5 composed of a ferromagnetic material on the auxiliary magnetic pole layer 4 with a gap provided therebetween. The end face 4a of the auxiliary magnetic pole layer 4 and the end face 5a of the main magnetic pole layer 5 are exposed at an opposing face Ha opposing the recording medium Md. The auxiliary magnetic pole layer 4 and the main magnetic pole layer 5 are magnetically coupled with each other at a magnetic coupling portion 6.

The auxiliary magnetic pole layer 4 and the main magnetic pole layer 5 are separated by a nonmagnetic insulating layer 7 composed of an inorganic material, for example, $Al_2O_3$ or $SiO_2$. Thus, the end face 7a of the nonmagnetic insulating layer 7 is exposed between the end face 4a and the end face 5a at the opposing face Ha.

A coil layer 8 composed of a conductive material such as Cu is embedded in the nonmagnetic insulating layer 7.

The thickness hw at the end face 5a of the main magnetic pole layer 5 is smaller than the thickness hr at the end face 4a of the auxiliary magnetic pole layer 4. The width of the end face 5a of the main magnetic pole layer 5 in the X direction (track width direction) in the drawing defines the track width which is remarkably smaller than the width of the end face 4a of the auxiliary magnetic pole layer 4 in the track width direction.

The recording medium Md which is subjected to magnetic recording by the perpendicular magnetic recording head H moves in the Y direction relative to the perpendicular magnetic recording head H. The recording medium Md has a hard layer Ma at the surface and a soft layer Mb at the inner side.

When a recording magnetic field is induced in the auxiliary magnetic pole layer 4 and the main magnetic pole layer 5 by a current flowing in the coil layer 8, a leakage magnetic field between the end face 4a of the auxiliary magnetic pole layer 4 and the end face 5a of the main magnetic pole layer 5 perpendicularly permeates the hard layer Ma of the recording medium Md towards the soft layer Mb. Since the area of the 5a of the main magnetic pole layer 5 is remarkably smaller than the area of the end face 4a of the auxiliary magnetic pole layer 4, as described above, the magnetic flux Φ is concentrated to a region which opposes the end face 5a of the main magnetic pole layer 5 and performs recording on the hard layer Ma at this region.

FIG. 33 is a partial front view of the perpendicular magnetic recording head shown in FIG. 32, viewed from the opposing face to the recording medium. The main magnetic pole layer 5 of the perpendicular magnetic recording head is formed by plating a magnetic material on a magnetic underlayer 5b. The resulting main magnetic pole layer 5 has a convex upper surface 5c. Both sides 5d are perpendicular to the track width direction (X direction in the drawing).

FIG. 34 is a plan view of a recorded track on the recording medium in which a signal is recorded by the perpendicular magnetic recording head shown in FIGS. 32 and 33.

When the slider 1 moves between an outer track and an inner track on the disk recording medium Md, the sides 5d of the main magnetic pole layer 5 sometimes tilts from the direction (Z direction in FIG. 33) perpendicular to the recording medium Md to generate a skew angle. When the sides 5d of the main magnetic pole layer 5 are perpendicular to the track width direction as shown in FIG. 33, the skew angle of the sides 5d of the main magnetic pole layer 5 from the direction (Z direction in the drawing) perpendicular to the recording medium causes the sides 5d to generate an oblique fringing magnetic field F at the exterior of the track width Tw, as shown in a broken line, resulting in deterioration of off-track performance.

Furthermore, the convex upper surface 5c of the main magnetic pole layer 5 forms a convex magnetic domain boundary which spreads the pulse width of the waveform to be recorded. This phenomenon precludes the formation of a definite recorded magnetization distribution when higher-density recording is performed. Accordingly, the recording density in the direction along the recording track (A direction in FIG. 34) does not increase.

SUMMARY OF THE INVENTION

An object of the present invention is to provide a method for making a perpendicular magnetic recording head which suppresses fringing of a recorded pattern to improve off-track performance and which improves recording density in the direction along the recording track.

A method for making a perpendicular magnetic recording head according to the present invention includes the following steps of:

(a) forming an auxiliary magnetic pole layer with a magnetic material;

(b) forming a coupling layer on the auxiliary magnetic pole layer with a magnetic material behind an opposing face, opposing a recording medium, of the perpendicular magnetic recording head;

(c) forming a coil layer in a region behind the opposing face;

(d) depositing an insulating layer on the auxiliary magnetic pole layer and depositing a plating base layer on the insulating layer;

(e) forming a resist layer on the plating base layer, and forming a groove in the resist layer, the width, at a position corresponding to the opposing face, of the groove in the track width direction gradually increasing from the bottom to the top of the resist layer, the groove having a predetermined length from the opposing face toward the backside;

(f) forming a main magnetic pole layer in the groove by plating;

(g) planarizing the top face of the main magnetic pole layer by milling in which milling particles enter at a tilt angle from the normal to the main magnetic pole layer;

(h) removing the resist layer: and (i) coupling the main magnetic pole layer with the coupling layer directly or by forming a yoke layer on the coupling layer over the main magnetic pole layer and the coupling layer.

According to this method, the auxiliary magnetic pole layer and the main magnetic pole layer are arranged with a gap therebetween at the opposing face to the recording medium, the coil layer supplying a recording magnetic field to the auxiliary magnetic pole layer and the main magnetic pole layer is provided behind the opposing face. Thus, in this perpendicular magnetic recording head, magnetic data is recorded on the recording medium by a magnetic field which is concentrated to the main magnetic pole layer and is perpendicular to the recording medium.

In the step (e) of this method, the groove is deformed so that the width of the resist layer in the track width direction gradually increases from the bottom to the top of the resist layer. In the step (f), the main magnetic pole layer is formed in the groove.

In the resulting perpendicular magnetic recording head, the width of the main magnetic pole layer in the track width direction gradually increases from the bottom near the auxiliary magnetic pole layer to the top at the trailing side. In other words, the main magnetic pole layer is inverted trapezoidal in a front view in which the top is wider than the bottom.

The inverted trapezoidal front shape of the main magnetic pole layer prevents the protrusion of a side of the main magnetic pole layer from the recording track during recording on the recording medium even if the side of the main magnetic pole layer form a skew angle with respect to the normal to the recording medium, preventing fringing and improving the off-track performance.

In the step (e), the resist layer is formed on the plating base layer, the groove is formed on the resist layer by patterning, the resist layer is annealed so that the width of the groove in the track width direction gradually increases from the bottom near the auxiliary magnetic pole layer to the top.

In the step (e), the resist layer is formed on the plating base layer and the patterning precision of the resist layer is adjusted so that the width of the resist layer in the track width direction gradually increases from the bottom to the top of the resist layer.

In the step (g), the top face of the main magnetic pole layer is planarized so that the main magnetic pole layer has a flat plane.

The recording medium moves from the auxiliary magnetic pole layer side to the yoke layer side of the perpendicular magnetic recording head. Thus, the shape of the magnetic domain boundary of the recording track on the recording medium depends on the shape of the top face of the main magnetic pole layer.

Since the main magnetic pole layer has a flat top face, the magnetic domain boundary of the recording track is linear. A definite recorded magnetization distribution with high recording density is obtained in the recording track direction, resulting in outstanding retrieval characteristics of recorded data.

In the present invention, the main magnetic pole layer is subjected to ion milling through the resist layer. Thus, only the top face of the main magnetic pole layer is etched by the ion milling step (g).

Since the opposing face of the main magnetic pole layer is inverted trapezoidal, the width of the top face decreases by the etching of the top face during the milling step. In other words, the milling of the top layer of the main magnetic pole layer decreases the track width of the perpendicular magnetic recording head.

If the main magnetic pole layer is subjected to ion milling after the resist layer is removed, the sides of the main magnetic pole layer is also etched together with the top face. Thus, the width of the main magnetic pole layer cannot be exactly controlled.

In the present invention, the sides of the main magnetic pole layer are not etched by the ion milling. Thus, the ion milling according to the step (g) contributes to improved processing accuracy of the main magnetic pole layer. The track width of the perpendicular magnetic recording head is, therefor, exactly determined.

The tilt angle in the step (g) is preferably in the range of 45° to 80° and more preferably 60° to 70°.

The method according to the present invention may further include the step (j), subsequent to the step (h), of removing the plating base layer in regions other than the main magnetic pole layer by ion milling in a direction which tilts by a predetermined angle from the normal to the main magnetic pole layer.

The plating base layer may be formed of a magnetic material or a nonmagnetic material in the step (d).

In the case of the nonmagnetic plating base layer, the recording characteristics of the perpendicular magnetic recording head is not adversely affected by the residual plating base layer at regions not lying under the main magnetic pole layer, or by contaminants adhered to the sides of the main magnetic pole layer during removing the plating base layer.

Thus, the width of the plating base layer in the track width direction may be larger than the width of the bottom face of the main magnetic pole layer in the track width direction in the above region after the protective layer is removed.

DESCRIPTION OF THE PREFERRED EMBODIMENTS

Figure 1:
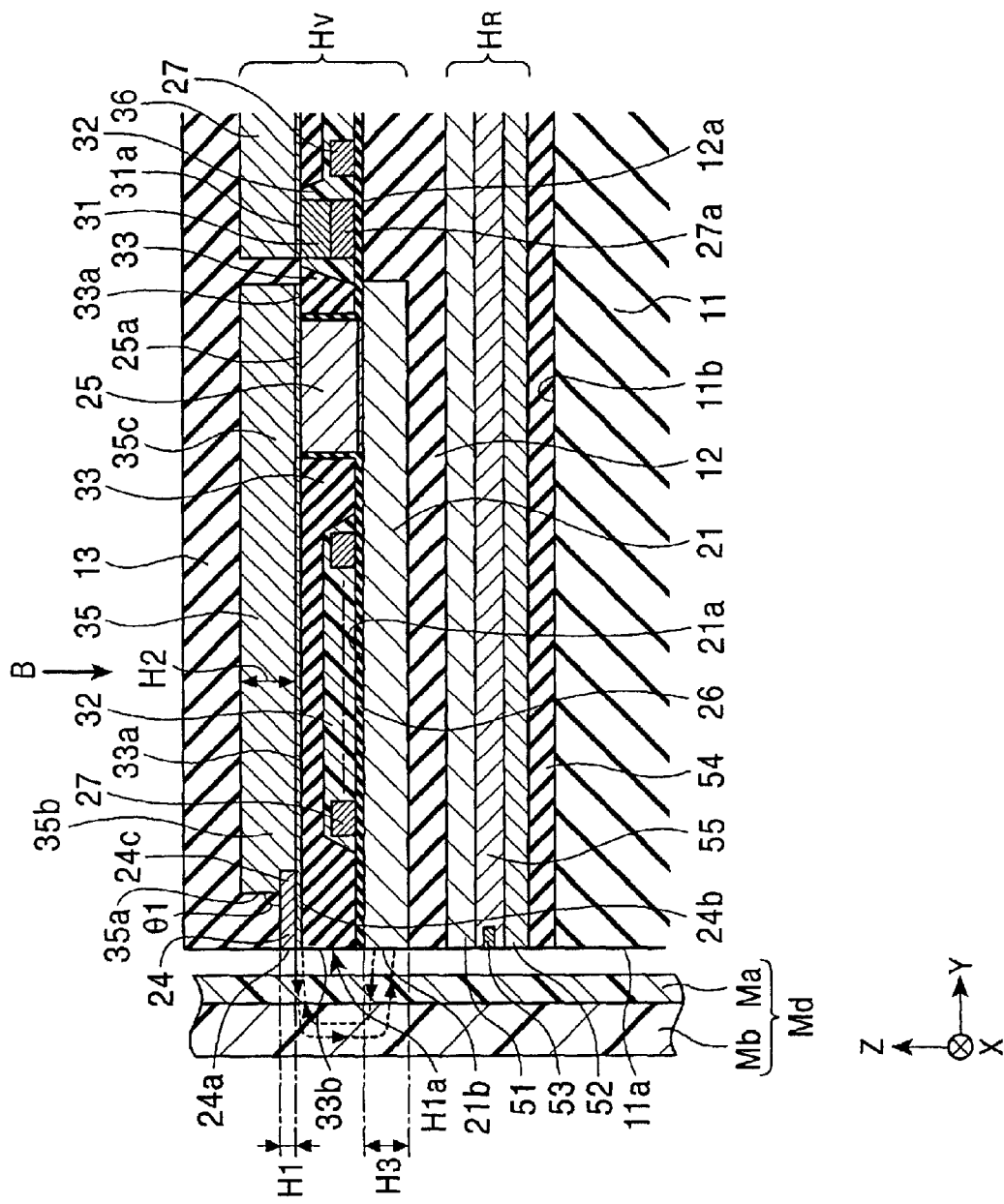
FIG. 1 is a longitudinal cross-sectional view of a perpendicular magnetic recording head according to a first embodiment of the present invention.
Figure 2:
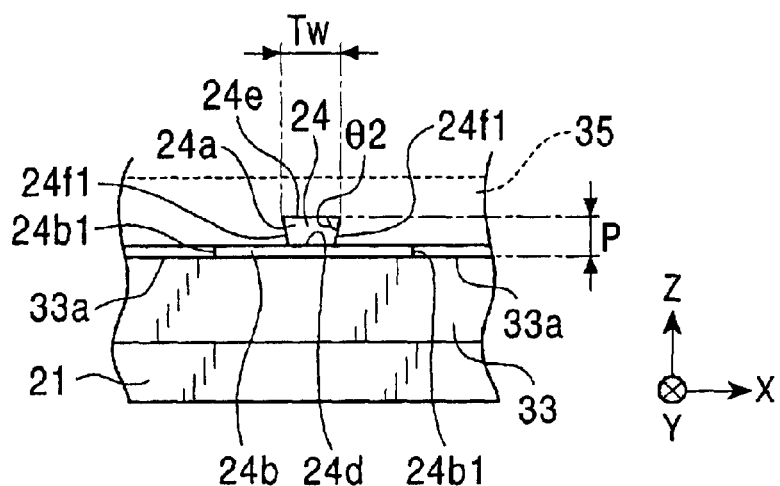
FIG. 2 is a partial front view of the perpendicular magnetic recording head shown in FIG. 1, viewed from an opposing face which opposes a recording medium.

FIG. 1 is a longitudinal cross-sectional view of a perpendicular magnetic recording head according to a first embodiment of the present invention, and FIG. 2 is a partial front view of the perpendicular magnetic recording head, viewed from an opposing face which opposes a recording medium.

The perpendicular magnetic recording head Hv shown in FIG. 1 applies a perpendicular magnetic field to a recording medium Md to perpendicularly magnetize a hard layer Ma of the recording medium Md.

The recording medium Md is a disk. The recording medium Md includes the surface hard layer Ma having high remanent magnetization and an inner soft layer Mb having high permeability. The disk recording medium Md rotates around the rotation axis thereof.

A slider 11 of the perpendicular magnetic recording head Hv is composed of a nonmagnetic material such as $Al_2O_3 \cdot TiC$. An opposing face 11a of the slider 11 opposes the recording medium Md. When the recording medium Md rotates the slider 11 floats by a surface airflow or slides on the recording medium Md. The perpendicular magnetic recording head is provided at a trailing side face 11b of the slider 11. In FIG. 1, the recording medium Md moves in the Z direction relative to the slider 11.

A nonmagnetic insulating layer 54 composed of an inorganic material, e.g., $Al_2O_3$ or $SiO_2$, is formed on the trailing side face 11b of the slider 11, and a reading component $H_R$ is formed on the nonmagnetic insulating layer 54.

The reading component $H_R$ includes a bottom shield layer 52, a gap layer 55, a magnetoresistive element 53, and a top shield layer 51, from the bottom. The magnetoresistive element 53 may be an anisotropic magnetoresistive (AMR) element, a giant magnetoresistive (GMR) element, or a tunneling magnetoresistive (TMR) element. A first nonmagnetic insulating layer 12 composed of an inorganic material, e.g., $Al_2O_3$ or $SiO_2$, is formed on the top shield layer 51, and the perpendicular magnetic recording head Hv according to the present invention is formed on the first nonmagnetic insulating layer 12. The perpendicular magnetic recording head Hv is covered with a protective layer 13 composed of an inorganic nonmagnetic insulating material or the like. The opposing face H1a, which opposes the recording medium, of the perpendicular magnetic recording head Hv is substantially flush with the opposing face 11a of the slider 11.

In the perpendicular magnetic recording head Hv, an auxiliary magnetic pole layer 21 is formed by plating using a ferromagnetic material such as Permalloy (NiFe alloy). The auxiliary magnetic pole layer 21 functions as a so-called return path layer. A first nonmagnetic insulating layer 12 is formed under the auxiliary magnetic pole layer 21 (between the auxiliary magnetic pole layer 21 and the top shield layer 51) and around the auxiliary magnetic pole layer 21. As shown in FIG. 1, the surface (top face) 21a of the auxiliary magnetic pole layer 21 is flush with the surface 12a of the first nonmagnetic insulating layer 12.

A second nonmagnetic insulating layer 26 of $Al_2O_3$ or the like is formed over the surface 21a of the auxiliary magnetic pole layer 21 and the surface 12a of the first nonmagnetic insulating layer 12 around the coupling layer 25. A coil layer 27 of a conductive material such as Cu is formed on the second nonmagnetic insulating layer 26. The coil layer 27 is formed by, for example, frame plating and has a spiral pattern with predetermined turns around the coupling layer 25. A bank layer 31 composed of a conductive material such as Cu is formed on a coupling end 27a at the winding center of the coil layer 27.

A coupling layer 25 of a NiFe alloy or the like is formed on the surface 21a of the auxiliary magnetic pole layer 21 behind the opposing face H1a in the height direction or the Y direction in the drawing.

A nonmagnetic insulating layer 26 of $Al_2O_3$ or the like is formed over the surface 21a of the auxiliary magnetic pole layer 21 and the surface 12a of the nonmagnetic insulating layer 12 around the coupling layer 25. A coil layer 27 of a conductive material such as Cu is formed on the nonmagnetic insulating layer 26. The coil layer 27 is formed by, for example, frame plating and has a spiral pattern with predetermined turns around the coupling layer 25. A bank layer 31 composed of a conductive material such as Cu is formed on a coupling end 27a at the winding center of the coil layer 27.

The coil layer 27 and the bank layer 31 are covered with an insulating layer 32 which is composed of an organic material such as a resist. Also, the insulating layer 32 is covered with an insulating layer 33.

The insulating layer 33 is preferably composed of at least one inorganic insulating material. Examples of inorganic insulating materials include AlO, $Al_2O_3$, $SiO_2$, $Ta_2O_5$, TiO, AlN, AlSiN, TiN, SiN, $Si_3N_4$, NiO, WO, $WO_3$, BN, CrN, and SION.

The coupling layer 25, the bank layer 31, and the insulating layer 33 are planarized so that the surface 25a, the surface 31a, and the surface 33a thereof are flush with each other. Such planarization is achieved by, for example, a chemical-mechanical polishing (CMP) process, as described below.

In the first embodiment, a main magnetic pole layer 24 composed of a NiFe alloy is formed on the insulating layer 33, and the front face 24a of the main magnetic pole layer 24 is flush with the opposing face H1a. The main magnetic pole layer 24 is formed on a plating base layer 24b composed of a nonmagnetic material by plating.

A yoke layer 35 composed of a NiFe alloy or the like is formed on the insulating layer 33. The yoke layer 35 is formed on the plating base layer 24b by plating. In FIG. 1, the tail 24c of the main magnetic pole layer 24 is magnetically coupled with the head 35b of the yoke layer 35 while the tail 35c of the yoke layer 35 is magnetically coupled with the surface 25a of the coupling layer 25.

The main magnetic pole layer 24 may extend toward the backside in the height direction so that the base end of the main magnetic pole layer 24 is magnetically coupled with the surface 25a of the coupling layer 25, and the yoke layer 35 may be formed above the main magnetic pole layer 24.

The front face 35a of the yoke layer 35 is recessed from the opposing face H1a in the height direction and is embedded in the protective layer 13. Thus, the front face 35a is not exposed at the opposing face H1a.

In this embodiment, the thickness H2 of the yoke layer 35 is larger than the thickness H1 of the main magnetic pole layer 24.

The front face 35a of the yoke layer 35 is perpendicular to the height direction (Y direction in the drawing). Alternatively, the front face 35a of the yoke layer 35 may be slanted or curved toward the height direction from the bottom to the top. The outer angle θ1 between the top face of the main magnetic pole layer 24 and the front face 35a of the yoke layer 35 is preferably 90° or more to reduce a leakage magnetic field from the main magnetic pole layer 24 to the yoke layer 35.

A lead layer 36 is formed on the surface 31a of the bank layer 31 so that a recording current flows from the lead layer 36 to the bank layer 31 and the coil layer 27. The lead layer 36 and the yoke layer 35 may be composed of the same material and may be simultaneously formed by plating. The yoke layer 35 and the lead layer 36 are covered with the $Al_2O_3$ protective layer 13.

Referring now to FIG. 2, in the main magnetic pole layer 24 exposed at the opposing face H1a, the width in the track width direction (X direction in the drawing) gradually increases from the bottom in contact with the plating base layer 24b to the top, so that the side 24e at the yoke layer 35 is wider than the side 24d at the auxiliary magnetic pole layer 21. Accordingly, the front shape at the opposing face H1a of the main magnetic pole layer 24 is inverted trapezoidal. Although the sides 24f1 of the main magnetic pole layer 24 are linear in FIG. 2, these sides 24f1 may be curved.

The periphery of the main magnetic pole layer 24 is covered by the protective layer 13.

The track width Tw of the perpendicular magnetic recording head shown in FIGS. 1 and 2 is defined by the width of the side 24e, near the yoke layer 35, of the main magnetic pole layer 24. In the present invention, the track width Tw can be reduced to generally 0.5 μm or less and preferably 0.3 μm or less. The pole length P which is the sum of the height of the plating base layer 24b and the height of the main magnetic pole layer 24 is about 0.3 μm. The thickness of the plating base layer 24b is in the range of 15 to 50 nm.

The plating base layer 24b is composed of a nonmagnetic material, e.g., Cu, Au, Pd, Rh, Ru, Pt, NiCu, NiP, NiPd, NiW, NiB, NiMo, Ir, NiCu, NiCr, Cr, or Ti. Even when the sides 24f1 of the main magnetic pole layer 24 and the sides 24b1 of the plating base layer 24b do not constitute a continuous straight or curved side, for example, as shown in FIG. 2, even when the width of the plating base layer 24b is larger than the width of the main magnetic pole layer 24, the nonmagnetic plating base layer 24b prevents deformation of the recorded track pattern on the recording medium.

The plating base layer 24b may be composed of a magnetic material, for example, NiFe or Ni. In such a case, the sides 24f1 of the main magnetic pole layer 24 and the sides 24b1 of the plating base layer 24b preferably constitute a continuous or curved face so that the plating base layer 24b and the main magnetic pole layer 24 define an inverted trapezoid.

In the inverted trapezoidal configuration, the track pattern recorded on the recording medium is not disordered by a leakage magnetic field from the plating base layer 24b even when the plating base layer 24b is composed of a magnetic material.

In this embodiment, the side 24e, near the yoke layer 35, of the main magnetic pole layer 24 is linear on the opposing face H1a.

The angle θ2 defined by the side 24e and each side 24f1 of the main magnetic pole layer 24 is preferably in the range of 60° to less than 90° and more preferably in the range of 60° to 80°.

Figure 3:
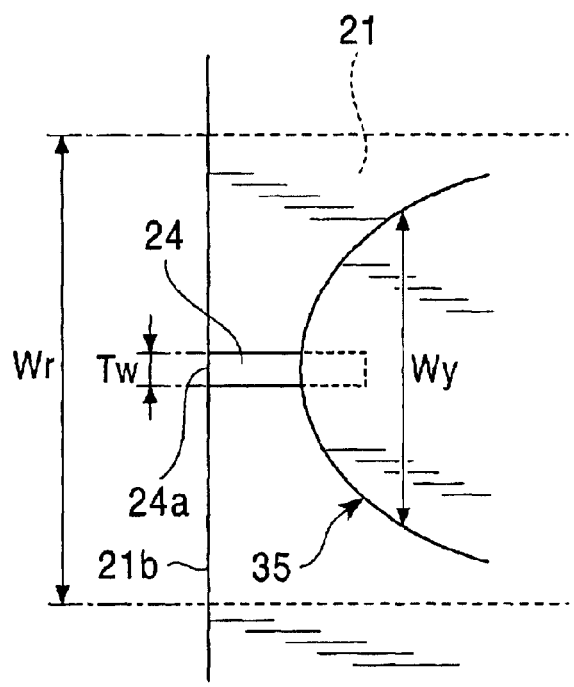
FIG. 3 is a plan view of the perpendicular magnetic recording head shown in FIG. 1, when viewed from arrow B in FIG. 1.

Referring now to FIG. 3, the width Wy of the yoke layer 35 gradually increases towards the backside. The yoke layer 35 having such a shape is deposited on the main magnetic pole layer 24.

Figure 4:
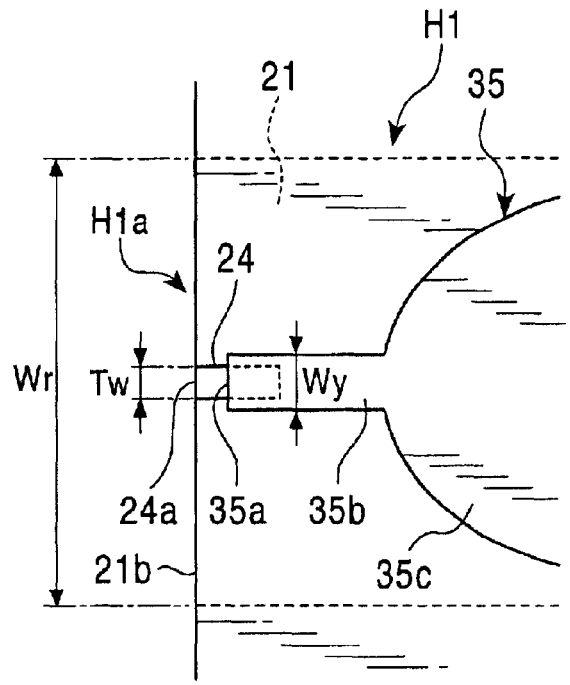
FIG. 4 is a plan view of a perpendicular magnetic recording head produced by another process in accordance with the present invention.

Referring now to FIG. 4, the yoke layer 35 may have a leading region 35b having a constant width Wy and a back region 35c having a gradually increasing width. In this case, the leading region 35b is deposited on the main magnetic pole layer 24.

Figure 5:
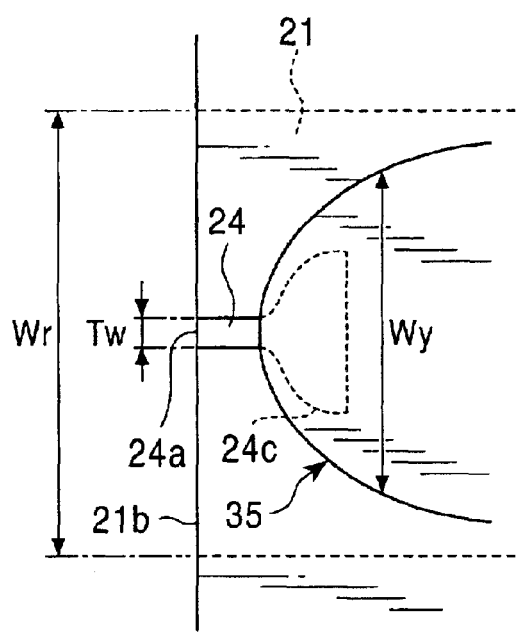
FIG. 5 is a plan view of a perpendicular magnetic recording head produced by another process in accordance with the present invention.

Referring to FIG. 5, the main magnetic pole layer 24 may have a leading region and a back region 24c having a gradually increasing width, and the back region 24c may be deposited on the yoke layer 35.

When the main magnetic pole layer 24 has the back region 24c having a gradually-increasing width, a magnetic flux from the yoke layer 35 well permeates the main magnetic pole layer 24, thus improving overwrite characteristics. When the back region 24c of the main magnetic pole layer 24 is completely covered by the yoke layer 35, as shown in FIG. 5, the permeation of the magnetic flux from the yoke layer 35 into the main magnetic pole layer 24 is further improved compared with a configuration in which the back region 24c protrudes from the yoke layer 35 at the front side.

In all the configurations shown in FIGS. 3, 4, and 5, the track width Tw of the exposed front face 24a of the main magnetic pole layer 24 is remarkably smaller than the width Wr of the exposed front face 21b of the auxiliary magnetic pole layer 21 in the track width direction, at the opposing face H1a. Furthermore, as shown in FIG. 1, the thickness H3 of the auxiliary magnetic pole layer 21 is smaller than the thickness H1 of the main magnetic pole layer 24. Thus, the area of the exposed front face 24a of the main magnetic pole layer 24 is remarkably smaller than the area of the front face 21b of the auxiliary magnetic pole layer 21 at the opposing face H1a. Moreover, the thickness H1 of the main magnetic pole layer 24 is smaller than the thickness H2 of the yoke layer 35.

In a cross-sectional view parallel to the opposing face H1a, the sectional area of the main magnetic pole layer 24 is smaller than that of the back region of the yoke layer 35.

Preferably, the main magnetic pole layer 24 is composed of a material which has a higher saturation magnetic flux density Bs than that of a material constituting the yoke layer 35.

In the perpendicular magnetic recording head Hv, a recording magnetic field is induced in the auxiliary magnetic pole layer 21 and the yoke layer 35 by a magnetic field generated by a current which flows in the coil layer 27 via the lead layer 36. As shown in FIG. 1, at the opposing face H1a, a leakage magnetic field from the front face 24a of the main magnetic pole layer 24 and the front face 21b of the auxiliary magnetic pole layer 21 penetrates the hard layer Ma and permeates the soft layer Mb of the recording medium Md. Since the area of the front face 24a of the main magnetic pole layer 24 is remarkably smaller than the area of the front face 21b of the auxiliary magnetic pole layer 21, the magnetic flux Φ of the leakage magnetic field is concentrated to the plating base layer 24b of the main magnetic pole layer 24. The concentrated magnetic flux Φ perpendicularly magnetizes the hard layer Ma to record magnetic data. Since the magnetic flux density of the hard layer Ma is saturated by the leakage magnetic field which is generated or absorbed in the front face 24a of the main magnetic pole layer 24, the hard layer Ma is barely magnetized by a leakage magnetic field which is absorbed or generated in the front face 21b of the auxiliary magnetic pole layer 21.

In this perpendicular magnetic recording head Hv, the main magnetic pole layer 24 and the yoke layer 35 are separately formed. Thus, the track width Tw and the thickness H1 of the main magnetic pole layer 24 and the width Wy and the thickness H2 of the yoke layer 35 can be independently determined. Thus, recording on narrow tracks is achieved by reducing the track width Tw of the main magnetic pole layer 24. Furthermore, the yoke layer 35 has a remarkably large sectional are. Thus, the majority of the recording magnetic field induced in the coil layer 27 is introduced to the main magnetic pole layer 24 via the yoke layer 35.

By forming the main magnetic pole layer 24 using a magnetic material which has a higher saturation magnetic flux density Bs than that of a material for the yoke layer 35, a high-density magnetic flux Φ is perpendicularly applied to the hard layer Ma through the main magnetic pole layer 24 having a small track width Tw and a small thickness H1, thus improving overwrite characteristics.

Figure 6:
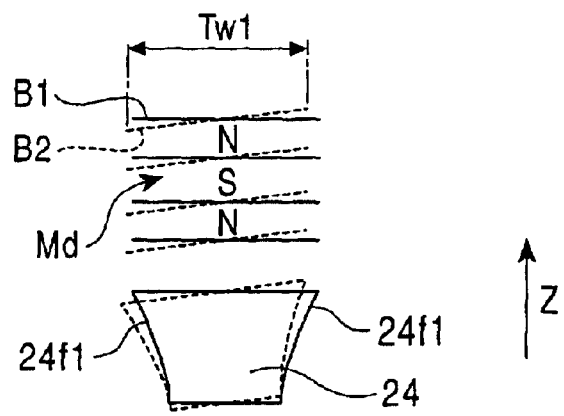
FIG. 6 is a schematic illustration of the generation of a skew angle of the perpendicular magnetic recording head shown in FIGS. 1 to 3.

FIG. 6 is a plan view of a recording track on the recording medium in which a signal is recorded by the perpendicular magnetic recording head shown in FIGS. 1 and 2.

Figure 33:
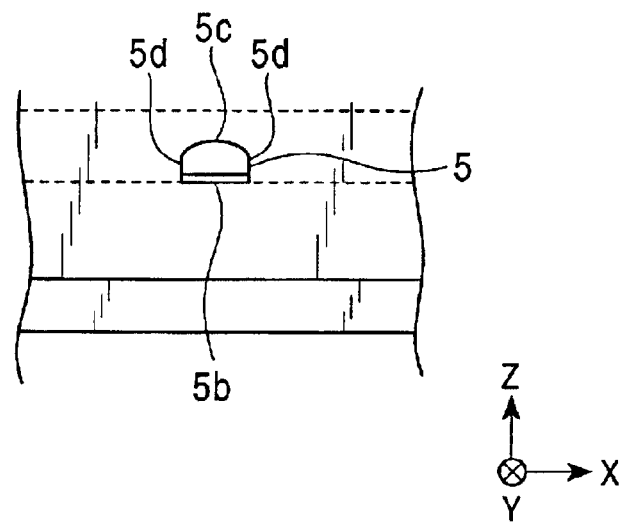
FIG. 33 is a partial front view of a known perpendicular magnetic recording head.
Figure 34:
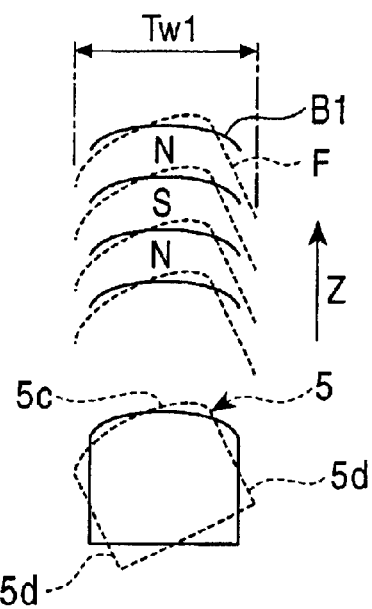
FIG. 34 is a schematic illustration of the generation of a skew angle of a known perpendicular magnetic recording head.

When the slider 11 moves between an outer track and an inner track on the disk recording medium Md, the sides 24f1 and 24f2 of the main magnetic pole layer 24 sometimes tilt with respect to the tangent direction (X direction in FIG. 33) of the rotation of the recording medium Md to generate a skew angle. As shown in FIG. 2, in the main magnetic pole layer 24 exposed to the opposing face H1a, the side 24e at the yoke layer 35 is wider than the side 24d at the auxiliary magnetic pole layer 21, and the front view of the main magnetic pole layer 24 at the opposing face H1a is inverted trapezoidal so that the width in the track width direction (X direction in the drawing) gradually increases from the bottom near the auxiliary magnetic pole layer 21 to the top.

Thus, as shown by broken lines in FIG. 6, the sides 24f1 of the main magnetic pole layer 24 do not substantially protrude from the recording track width Tw when the sides 24f1 of the main magnetic pole layer 24 have a skew angle with respect to the tangent direction (Z direction in the drawing) of the rotation of the recording medium. Accordingly, the sides 24f1 do not generate fringing, improving off-track performance.

Since the upper side 24e (at the trailing side) of the main magnetic pole layer 24 is linear, the magnetic domain boundary B1 or B2 on the recording track is also linear, the pulse width of the waveform to be recorded is decreased, resulting in a definite recording magnetization distribution in high-density recording. Accordingly, the recording density in the length direction (Z direction in the drawing) of the recording track is increased.

A method for making the perpendicular magnetic recording head shown in FIGS. 1 to 3 will now be described. FIGS. 7 to 10 are longitudinal cross-sectional views illustrating steps for making the perpendicular magnetic recording head.

Figure 7:
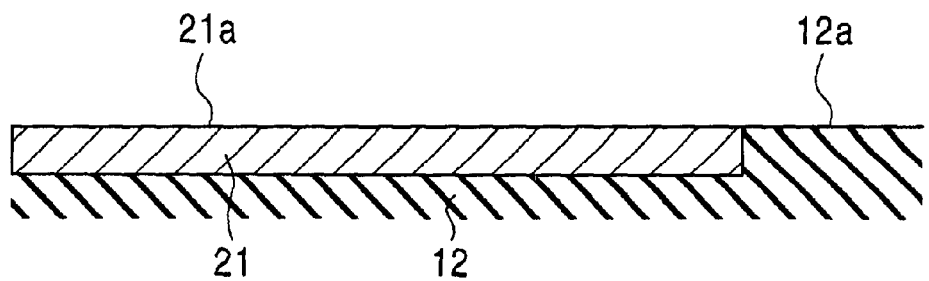
FIG. 7 is a longitudinal cross-sectional view of a step for making a perpendicular magnetic recording head.

Referring to FIG. 7, an auxiliary magnetic pole layer 21 is formed on a nonmagnetic insulating layer 12, and the backside in the height direction of the auxiliary magnetic pole layer 21 is also filled with the auxiliary magnetic pole layer 21. The upper surfaces of the auxiliary magnetic pole layer 21 and the nonmagnetic insulating layer 12 are planarized by, for example, a CMP process.

Figure 8:
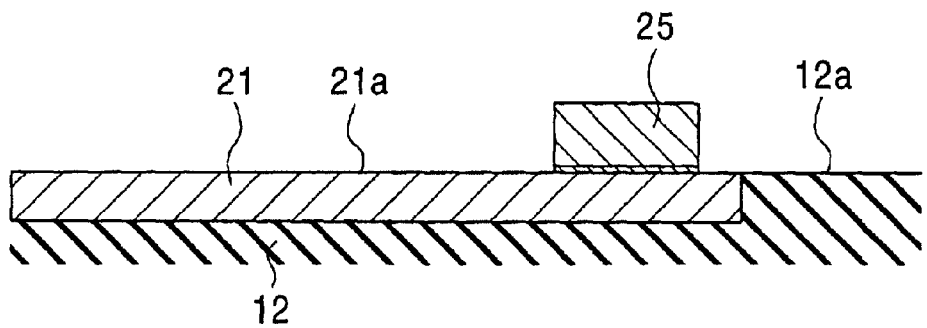
FIG. 8 is a longitudinal cross-sectional view of a subsequent step for making the perpendicular magnetic recording head.

Referring to FIG. 8, a magnetic coupling layer 25 is formed at the backside in the height direction of the auxiliary magnetic pole layer 21 by plating. The coupling layer 25 may be formed after a coil layer 27 (described below) is formed.

Figure 9:
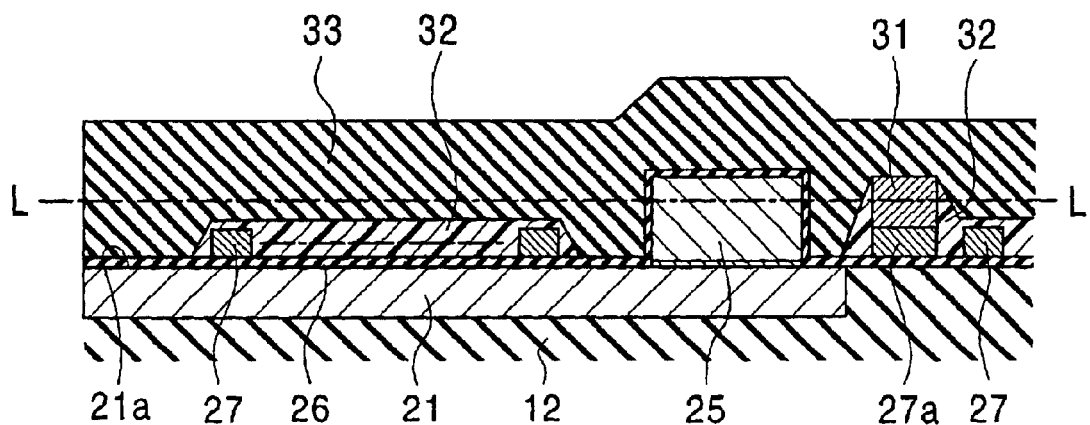
FIG. 9 is a longitudinal cross-sectional view of a subsequent step for making the perpendicular magnetic recording head.

Referring to FIG. 9, a nonmagnetic insulating layer 26 is formed over the surface 21a of the auxiliary magnetic pole layer 21 and the upper face of the coupling layer 25 by sputtering an inorganic material. The coil layer 27 composed of a conductive material such as Cu is formed on the nonmagnetic insulating layer 26 by frame plating, and then a bank layer 31 is formed by plating. Herein, the height of the coil layer 27 is formed so as to be lower than the height of the coupling layer 25. The coil layer 27 and the bank layer 31 are covered with an organic insulating layer 32, and an insulating layer 33 for covering all the layers is formed by sputtering using an inorganic material.

The deposited layers are polished by a CMP process up to a level plain (plain L—L) which intersects all the insulating layer 33, the coupling layer 25, and the bank layer 31.

Figure 10:
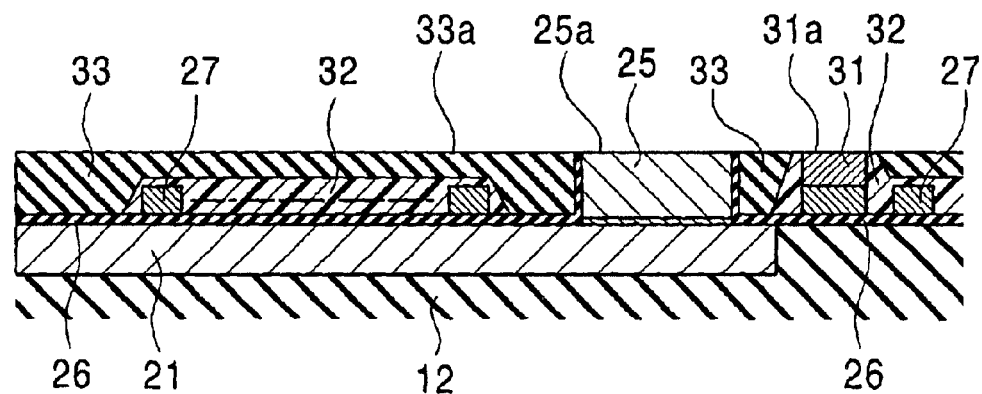
FIG. 10 is a longitudinal cross-sectional view of a subsequent step for making the perpendicular magnetic recording head.

Referring to FIG. 10, the surface 25a of the coupling layer 25, the surface 33a of the insulating layer 33, and the surface 31a of the bank layer 31 are flush with each other by the polishing.

Figure 11A:
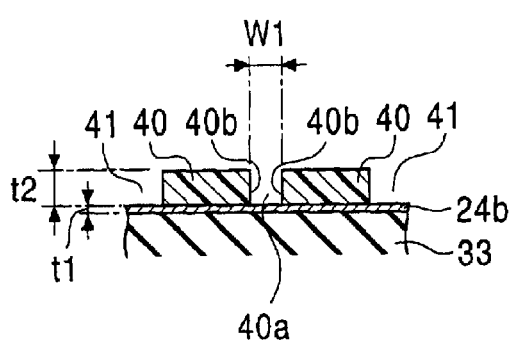
FIGS. 11A and 11B are a transverse cross-sectional view and a plan view, respectively, of a perpendicular magnetic recording head for illustrating a production step.
Figure 11B:
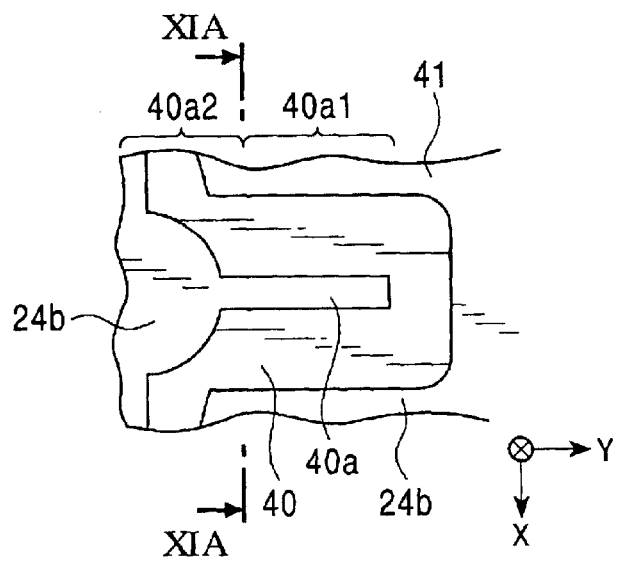
Figure 12A:
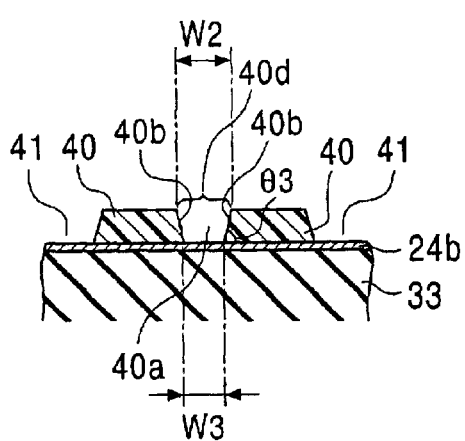
FIGS. 12A and 12B are a transverse cross-sectional view and a plan view, respectively, of a perpendicular magnetic recording head for illustrating another production step.
Figure 12B:
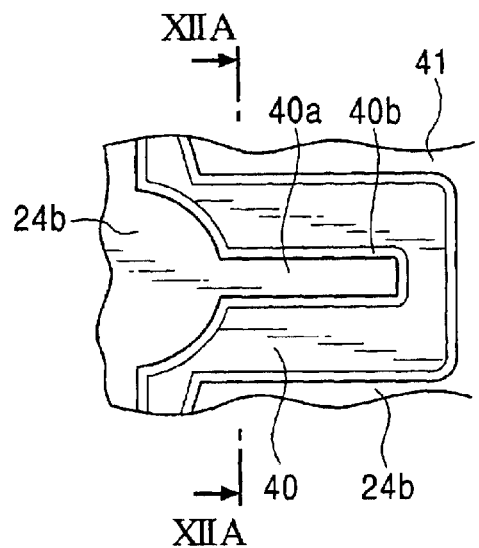

A method for making the main magnetic pole layer 24 of the perpendicular magnetic recording head shown in FIGS. 1 to 3 will now be described. FIG. 11B is a partial plan view in the vicinity of the main magnetic pole layer 24 in a production step, and FIG. 11A is a partial cross-sectional view taken along line XIA-XIA in FIG. 11B. Similarly, FIG. 12B is a partial plan view in the vicinity of the main magnetic pole layer 24 in another production step, and FIG. 12A is a partial cross-sectional view taken along line XIIA—XIIA in FIG. 12B.

Referring to FIGS. 11A and 11B, a plating base layer 24b is deposited over the surface 33a of the insulating layer 33, the surface 25a of the coupling layer 25, and the surface 31a of the bank layer 31. Then, a resist layer 40 is formed on the entire plating base layer 24b and a groove 40a having a predetermined depth toward the backside and exposing the main magnetic pole layer 24 is formed by exposure and development at a portion corresponding to the opposing face to a recording medium. The groove 40a consists of a plating well groove 40a2 having an increasing width toward the left (the Y direction) in the drawing and a pole-forming groove 40a1 having a constant width. The exposed plating base layer 24b at the exterior of the resist layer 40 is used as a dummy plating portion 41 for forming dummy plating in a subsequent plating step.

The plating base layer 24b is formed into a thickness t1 in the range of 15 to 50 nm. The plating base layer 24b is formed of a nonmagnetic material e.g., Cu, Au, Pd, Rh, Ru, Pt, NiCu, NiP, NiPd, NiW, NiB, NiMo, Ir, NiCu, NiCr, Cr, or Ti. Alternatively, the plating base layer 24b may be formed of a magnetic material, e.g., NiFe or Ni.

The resist layer 40 is formed and exposed as follows. The thickness t2 of the resist layer 40 is 0.5 to 2.0 μm. The exposure is performed using the i-line and preferably using KrF electron beams to achieve a fine resolution.

The width W1 of the groove 40a in the track width direction is in the range of 0.15 to 0.4 μm.

After forming the groove 40a, the resist layer 40 is annealed to form straight or curved slant sides 40b of the groove 40a, so that the width in the track width direction of the groove 40a gradually increases from the bottom to the top of the resist layer. In FIG. 2A, the sides 40b of the groove 40a are slanted.

The annealing conditions for the resist layer 40 are as follows:

Annealing temperature: 80° C. to 140° C.
Annealing time: 5 to 20 min
The angle θ3 defined by the surface of the plating base layer 24b and a side 40b of the resist layer 40 after annealing is controlled to the range of 60° to less than 90° and preferably 60° to 80°. In this embodiment, the angle θ3 is 65°. The angle θ3 defines the taper angle of the sides of the main magnetic pole layer 24 which will be formed later. The width W3 in the track width direction of the bottom 40c of the groove 40a is in the range of 0.15 to 0.4 μm, wherein W1>W3.

In the present invention, the thickness t2 of the resist layer 40, the width W3 in the track width direction of the bottom 40c of the groove 40a, and the angle θ3 between the surface of the plating base layer 24b and the side 40b of the resist layer 40 are controlled to determine the width of the top face 24j of the main magnetic pole layer 24, namely, the track width Tw.

Figure 13:
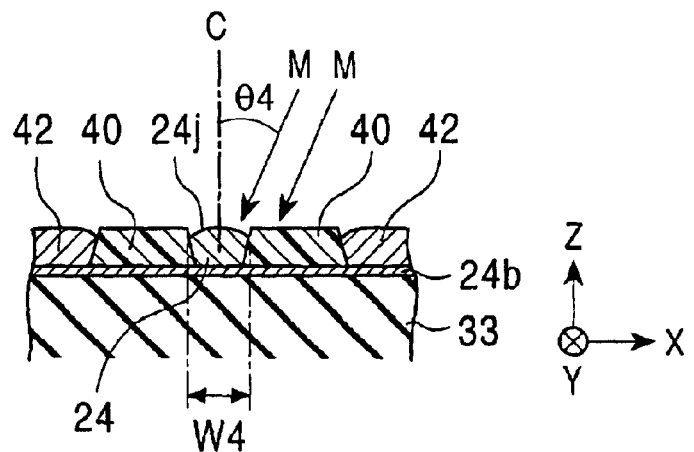
FIG. 13 is a transverse cross-sectional view of a step for making a perpendicular magnetic recording head.

FIG. 13 shows a cross-sectional view illustrating a state of plated layers which are formed in the groove 40a and on the dummy plating portion 41 using a ferromagnetic material such as NiFe after the step shown in FIG. 12A. The plated layer formed in the resist layer 40 functions as a main magnetic pole layer 24 and the plated layer formed on the dummy plating portion 41 functions as a dummy plated layer 42 which improves the quality of the plated layers. The plated layers are formed by pulse plating. In this embodiment, however, the dummy plating portion 41 and the dummy plated layer 42 are not always necessary.

In this embodiment, the width W4 of the top face 24j of the main magnetic pole layer 24 is 0.35 μm. This width W4 is determined by controlling the θ3 between the surface of the annealed plating base layer 24b and a side 40b of the resist layer 40, the width W3 in the track width direction of the bottom 40c of the groove 40a, and the thickness of the plated main magnetic pole layer 24.

The plated top face 24j is convex as shown in FIG. 13.

Next, the main magnetic pole layer 24 is irradiated with milling particles M which are incident at an angle θ4 from the perpendicular center line C for anisotropic milling.

Since the main magnetic pole layer 24 subjected to ion milling is surrounded by the resist layer 40, only the top face 24j of the main magnetic pole layer 24 is etched away.

Since the main magnetic pole layer 24 is inverted trapezoidal as shown in FIG. 13, the width of the top face 24j also decreases by the ion milling. As a result, the track width Tw of the perpendicular magnetic recording head is reduced by milling the top face 24j of the main magnetic pole layer 24.

If the main magnetic pole layer 24 is ion-milled after the resist layer 40 is removed, the sides 24f of the main magnetic pole layer 24 is also etched during the ion milling. This process precludes exact determination of the width of the top face 24j of the main magnetic pole layer 24.

In the present invention, only the top face 24j is etched away in the thickness direction (Z direction in the drawing) during the ion milling. Thus, the track width Tw of the perpendicular magnetic recording head is more precisely determined as a result of the improved ion milling process for the main magnetic pole layer 24.

Furthermore, the ion milling oblique to the perpendicular centerline C of the main magnetic pole layer 24 planarizes the top face 24j thereof.

Since the NiFe alloy of the main magnetic pole layer 24 and the organic resist of the resist layer 40 have the substantially same etching rate, the resist layer 40 is also etched together with the main magnetic pole layer 24 and the dummy plated layer 42.

The angle θ4 to the perpendicular centerline C is preferably in the range of 45° to 85° and more preferably 60° to 70°. In this embodiment, the angle θ4 is 70°.

Figure 14:
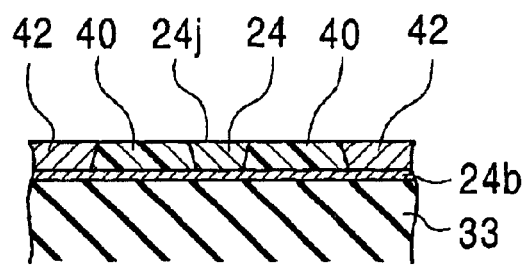
FIG. 14 is a transverse cross-sectional view of a step for making a perpendicular magnetic recording head.

FIG. 14 is a cross-sectional view of the ion-milled main magnetic pole layer 24. The top face 24j is planarized.

Figure 15:
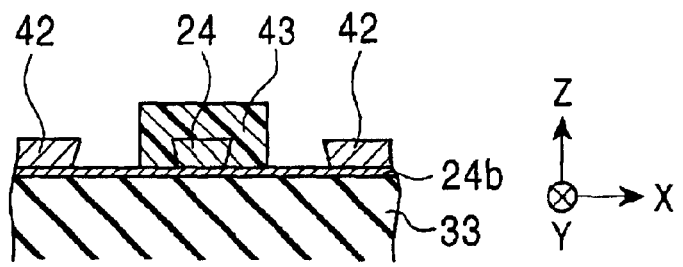
FIG. 15 is a transverse cross-sectional view of a step for making a perpendicular magnetic recording head.
Figure 16A:
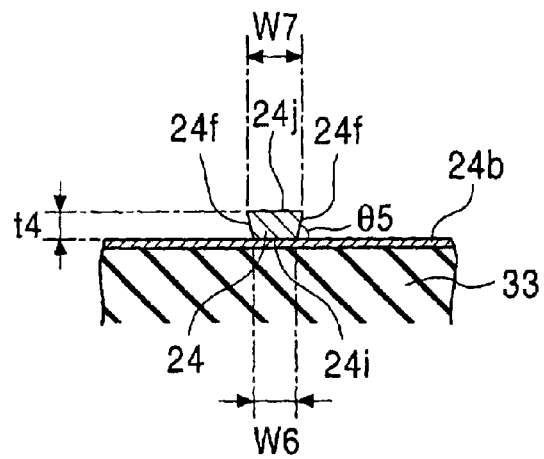
FIGS. 16A and 16B are a transverse cross-sectional view and a plan view, respectively, of a perpendicular magnetic recording head for illustrating another production step.
Figure 16B:
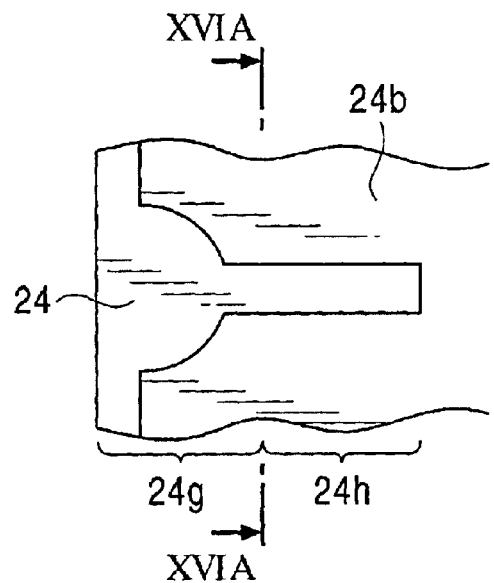

Referring to FIG. 15, the resist layer 40 is removed. Next, the main magnetic pole layer 24 is covered with a resist 43, and the dummy plated layer 42 is etched away. FIG. 16B is a partial plan view in the vicinity of the main magnetic pole layer 24 after the dummy plated layer 42 is removed, and FIG. 16A is a partial cross-sectional view taken along line XVIA—XVIA in FIG. 16B. Referring to FIG. 16B, the main magnetic pole layer 24 has a plating well 24g having an increasing width toward the left (the Y direction) in the drawing and a pole-forming groove 24h having a constant width. The plating well 24g facilitates the formation of a uniform main magnetic pole layer 24. This plating well 24g is removed by polishing in a subsequent production step, and thus, the perpendicular magnetic recording head does not have the plating well 24g. Accordingly, the perpendicular magnetic recording head has a main magnetic pole layer 24 only having the pole-forming groove 24h. The cross section along line XVI—XVI functions as the opposing face of the perpendicular magnetic recording head.

Regarding the pole-forming groove 24h of the main magnetic pole layer 24 after the ion milling, the width W6 of the bottom face 24i is 0.15 to 0.4 μm, the width W7 of the top face 24j (corresponding to the track width Tw) is 0.25 to 0.54 μm, and the height t4 is 0.2 to 0.45 μm. The angle θ5 between the bottom face 24i and the side face 34f is 65°.

The angle θ5 shown in FIG. 16A is equal to the angle θ3 between the surface of the plating base layer 24b and a side 40b of the resist layer 40 shown in FIG. 12, and also is equal to the angle θ2 (taper angle) between the side 24e and the sides 24f1 of the main magnetic pole layer 24 shown in FIG. 2.

Figure 17:
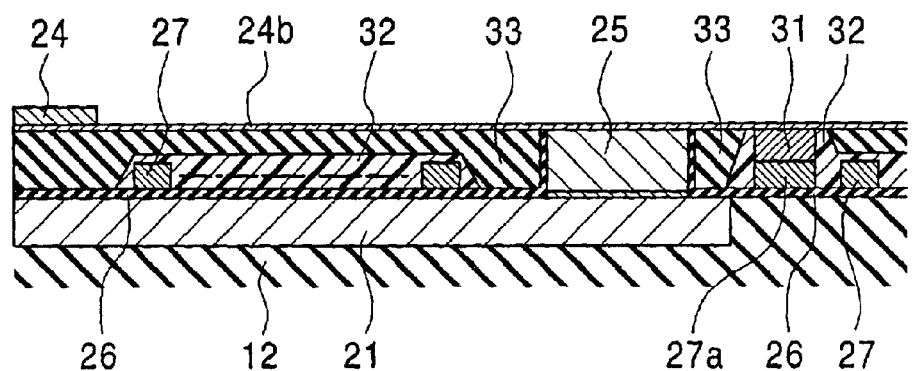
FIG. 17 is a longitudinal cross-sectional view of a step for making a perpendicular magnetic recording head.

FIG. 17 is a longitudinal cross-sectional view of the perpendicular magnetic recording head after the step shown in FIG. 16. The main magnetic pole layer 24 of the perpendicular magnetic recording head shown in FIG. 17 has an inverted-trapezoidal cross-section as shown in FIG. 16.

The plating base layer 24b facilitating the formation of the main magnetic pole layer 24 by plating is also deposited on the surface 25a of the coupling layer 25 and the surface 31a of the bank layer 31.

Figure 18:
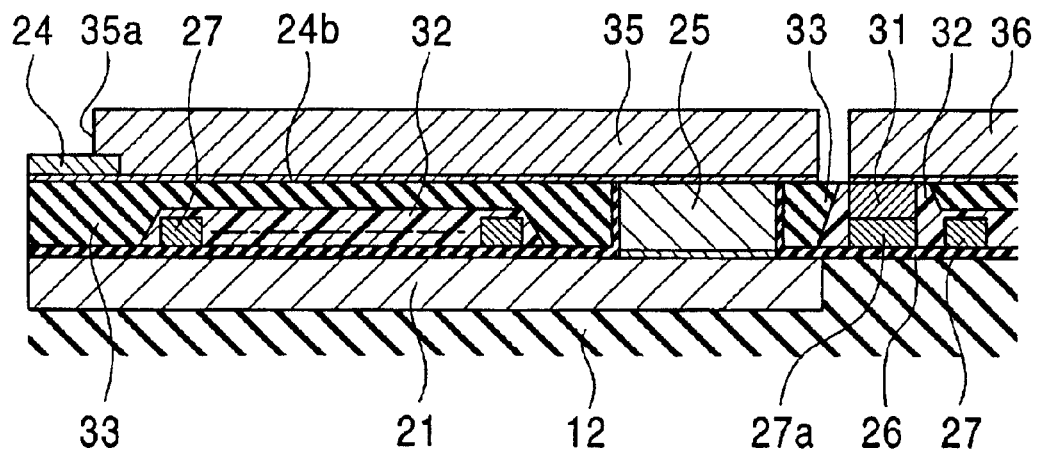
FIG. 18 is a longitudinal cross-sectional view of a step for making a perpendicular magnetic recording head.
Figure 19:
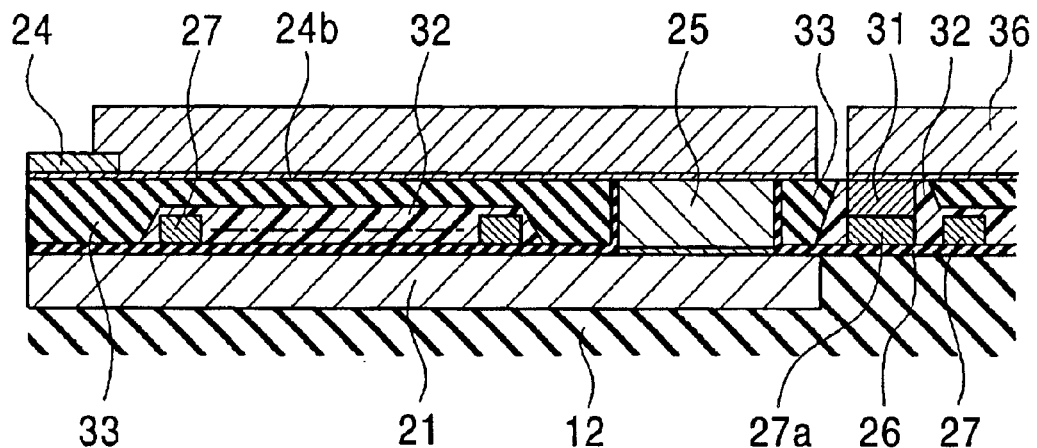
FIG. 19 is a longitudinal cross-sectional view of a step for making a perpendicular magnetic recording head.

Referring to FIG. 18, a yoke layer 35 is formed on the plating base layer 24b by plating so that the coupling layer 25 is magnetically coupled with the main magnetic pole layer 24 and the coupling layer 25. The width of the yoke layer 35 in the track width direction is larger than the width of the main magnetic pole layer 24 at a position in contact with the yoke layer 35.

The planar shape of the main magnetic pole layer 24 shown in FIG. 4 or 5 is determined such that the shape of the pole-forming groove 40a1 when exposing and developing the resist layer 40 in the step shown in FIG. 11 is the same as the planar shape of the main magnetic pole layer 24 shown in FIG. 4 or 5.

The leading end of the yoke layer 35 may have a shape shown in FIG. 3, 4, or 5. Moreover, the yoke layer 35 may be laid on the main magnetic pole layer 24 as shown in FIG. 3, 4, or 5.

As shown in FIG. 1, the front face 35a of the yoke layer 35 is formed so as to be recessed in the height direction from the opposing face H1a.

In addition, the thickness H2 of the yoke layer 35 is formed so as to be larger than the thickness H1 of the main magnetic pole layer 24.

Moreover, the front face 35a of the yoke layer 35 is perpendicular to the height direction (Y direction in the drawing). Alternatively, the front face 35a of the yoke layer 35 may be slanted or curved toward the height direction from the bottom to the top. The outer angle θ1 between the top face of the main magnetic pole layer 24 and the front face 35a of the yoke layer 35 is preferably 90° or more to reduce a leakage magnetic field from the main magnetic pole layer 24 to the yoke layer 35 and thus to concentrate the magnetic field to the main magnetic pole layer 24.

Preferably, the main magnetic pole layer 24 is composed of a material which has a higher saturation magnetic flux density Bs than that of a material constituting the yoke layer 35.

Referring to FIG. 18, a lead layer 36 is formed on the bank layer 31 by plating using a conductive material such as copper, the lead layer 36 being magnetically coupled with the bank layer 31. The unnecessary portion of the plating base layer 24b in the vicinity of the yoke layer 35 and the lead layer 36 is removed by ion milling to insulate the yoke layer 35 and the lead layer 36.

In this embodiment, the plating base layer 24b is formed of a nonmagnetic material, for example, Cu, Au, Pd, Rh, Ru, Pt, NiCu, NiP, NiPd, NiW, NiB, NiMo, Ir, NiCu, NiCr, Cr, or Ti. Thus, the recorded track pattern on the recording medium is not disordered even if the plating base layer 24b remains in the vicinity of the main magnetic pole layer 24. Accordingly, the plating base layer 24b may not be completely removed as long as the main magnetic pole layer 24 and the lead layer 36 are electrically insulated.

Figure 21:
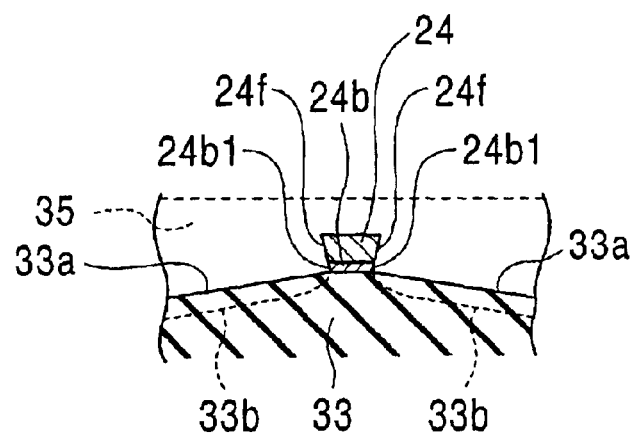
FIG. 21 is a transverse cross-sectional view of a step for making a perpendicular magnetic recording head.

However, as shown in FIG. 21, the plating base layer 24b other than the portion under the main magnetic pole layer 24 may be completely removed. Preferably, each side 24f of the main magnetic pole layer 24 and the corresponding side 24b1 of the plating base layer 24b constitute a continuous straight or curved side so that the plating base layer 24b and the main magnetic pole layer 24 constitute one inverted trapezoid. When the plating base layer 24b other than the portion under the main magnetic pole layer 24 is completely removed, the plating base layer 24b may be formed of a magnetic material, e.g., NiFe or Ni.

When the plating base layer 24b other than the portion under the main magnetic pole layer 24 is completely removed, as shown in FIG. 21, the surfaces 33a, lying at both sides of the main magnetic pole layer 24, of the insulating layer 33 slope downward from the main magnetic pole layer 24. Alternatively, the insulating layer 33 may have concave surfaces 33b.

Figure 20A:
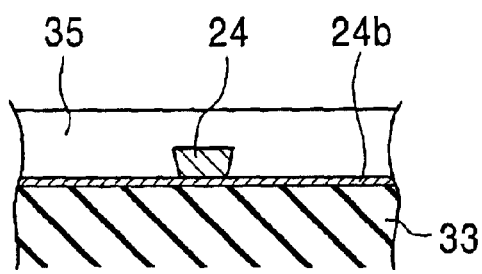
FIGS. 20A and 20B are a transverse cross-sectional view and a plan view, respectively, of a perpendicular magnetic recording head for illustrating another production step.
Figure 20B:
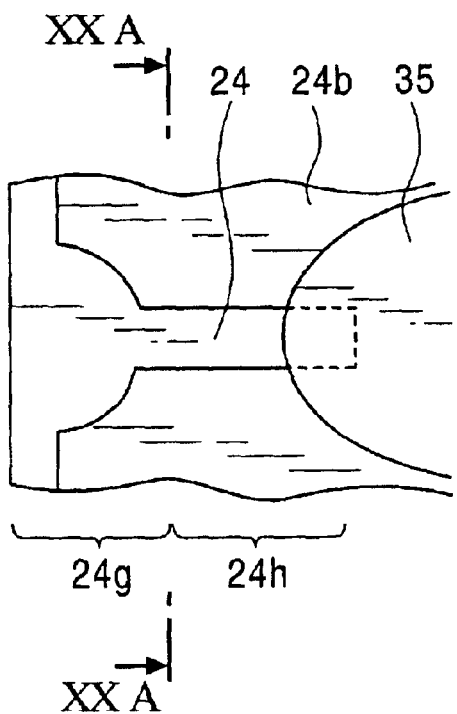

When the plating base layer 24b other than the portion under the main magnetic pole layer 24 is completely removed, contaminants formed during removing the plating base layer 24b will adhere to the sides 24f of the main magnetic pole layer 24, or the sides 24f and the top face 24j will be etched. As a result, the width of the main magnetic pole layer 24 in the track width direction will vary. Accordingly, it is preferable that the plating base layer 24b be formed of a nonmagnetic material and the plating base layer be not completely removed in the vicinity of the main magnetic pole layer 24 as shown in FIGS. 20A and 20B.

The yoke layer 35 and the lead layer 36 may be simultaneously formed using the same magnetic material.

Next, the protective layer 13 shown in FIG. 1 is formed. The opposing face H1a is polished to form a flush surface including the front face 21b of the auxiliary magnetic pole layer 21, the front face 33a of the insulating layer 33, and the front face 24a of the main magnetic pole layer 24.

The opposing face 11a of the slider 11 shown in FIG. 11 and the opposing face H1a of the perpendicular magnetic recording head Hv may be covered with an abrasion-resistant protective film composed of carbon such as diamond-like carbon (DLC), if necessary.

When the plating base layer 24b other than the portion under the main magnetic pole layer 24 is completely removed, the plating base layer 24b is preferably removed before the yoke layer 35 is formed, as described below.

Figure 22:
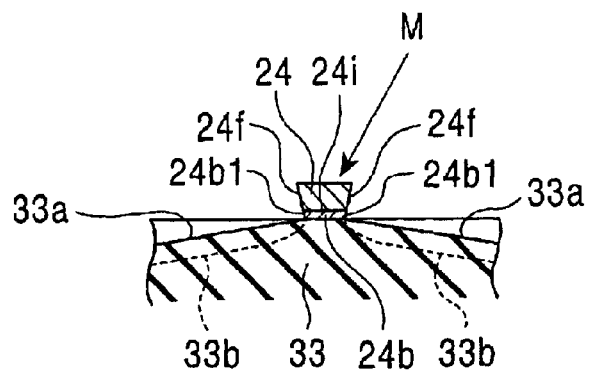
FIG. 22 is a longitudinal cross-sectional view of another step for making the perpendicular magnetic recording head.

Subsequent to the step shown in FIG. 16, the plating base layer 24b other than the portion under the main magnetic pole layer 24 is completely removed by ion milling as shown in FIG. 22.

When the plating base layer 24b is removed before the yoke layer 35 is formed, each side 24f of the main magnetic pole layer 24 and the corresponding side 24b1 of the plating base layer 24b readily form a continuous straight or curved side. Thus, the plating base layer 24b and the main magnetic pole layer 24 readily form an inverted trapezoidal cross section. In such a case, the plating base layer may be formed of a magnetic material such as NiFe or elemental Ni.

Referring to FIG. 22, this ion milling process also forms declining surfaces 33a or concave surfaces 33b on the insulating layer 33 from both sides of the main magnetic pole layer 24.

Figure 23:
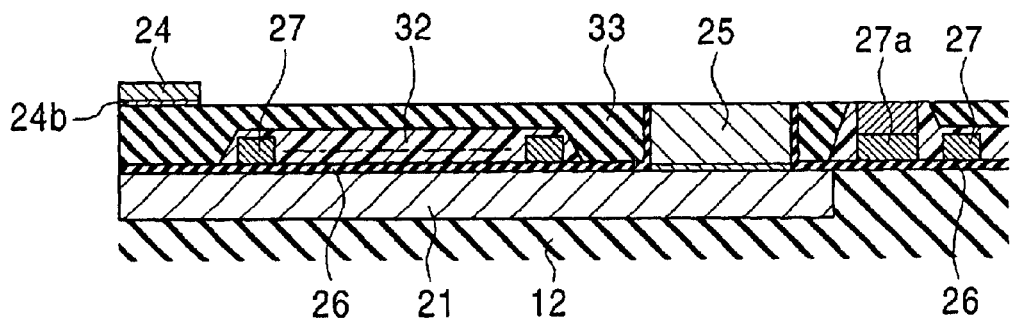
FIG. 23 is a longitudinal cross-sectional view of another step for making the perpendicular magnetic recording head.

FIG. 23 is a longitudinal cross-sectional view of the perpendicular magnetic recording head after the step shown in FIG. 22. The main magnetic pole layer 24 of the perpendicular magnetic recording head shown in FIG. 23 has an inverted-trapezoidal cross-section as shown in FIG. 22.

Figure 24:
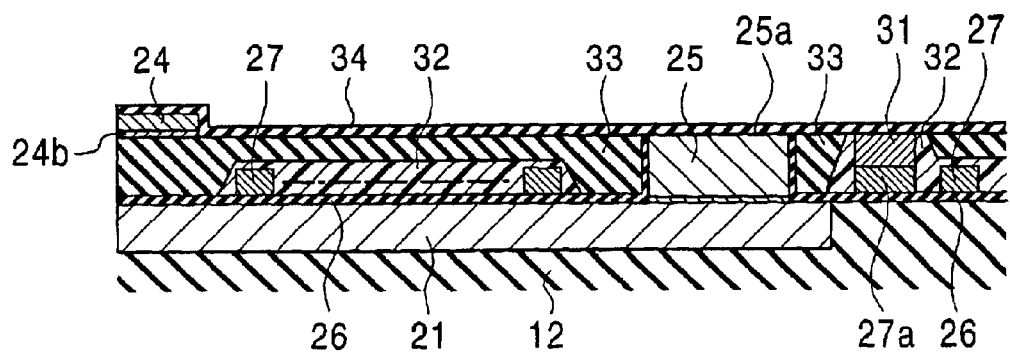
FIG. 24 is a longitudinal cross-sectional view of another step for making the perpendicular magnetic recording head.

Referring to FIG. 24, an inorganic insulating layer 34 is deposited over the main magnetic pole layer 24, the insulating layer 33, the coupling layer 25, and the bank layer 31.

Instead of the above-mentioned ion-milling planarization, the top face 24j of the main magnetic pole layer 24 may be planarized by CMP after the main magnetic pole layer 24 is covered with the insulating layer 34.

Figure 25:
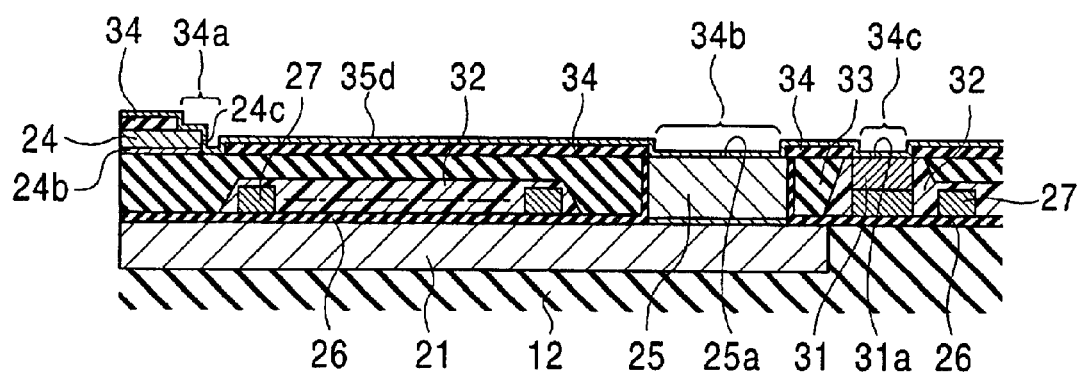
FIG. 25 is a longitudinal cross-sectional view of another step for making the perpendicular magnetic recording head.
Figure 26:
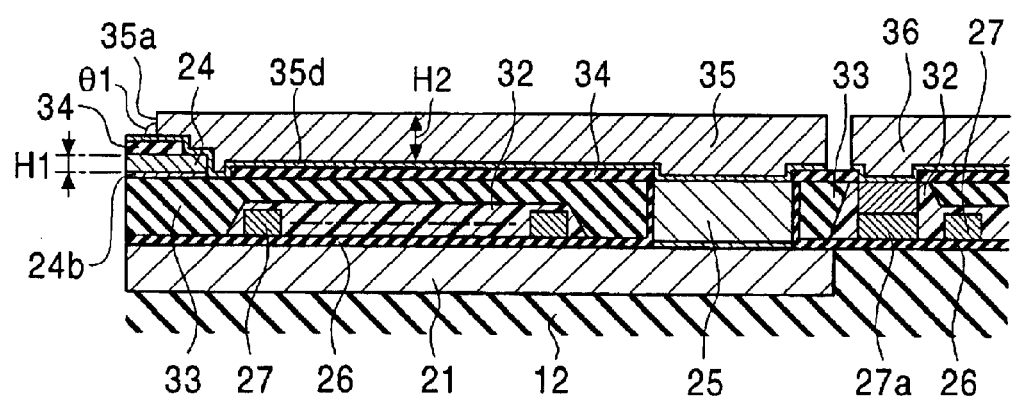
FIG. 26 is a longitudinal cross-sectional view of another step for making the perpendicular magnetic recording head.

Referring to FIG. 25, holes 34a, 34b, and 34c are formed in the inorganic insulating layer 34 to expose the tail 24c of the main magnetic pole layer 24, the surface 25a of the coupling layer 25, and the surface 31a of the bank layer 31, respectively. An plating base layer 35d is deposited over the tail 24c of the main magnetic pole layer 24, the insulating layer 34, the surface 25a of the coupling layer 25, and the surface 31a of the bank layer 31.

The plating base layer 35d may be formed of a nonmagnetic material, e.g., NiFe or elemental Ni, or a nonmagnetic material, e.g., Cu, Au, Pd, Rh, Rh, Pt, NiCu, NIP, NiPd, NiW, NiB, NiMo, Ir, NiCu, NiCr, Cr, or Ti.

Next, a yoke layer 35 is formed over the main magnetic pole layer 24 and the coupling layer 25 by plating. The width of the yoke layer 35 in the track width direction is larger than the width of the main magnetic pole layer 24 at a position in contact with the yoke layer 35.

Also, in this embodiment, the thickness H2 of the yoke layer 35 is formed so as to be larger than the thickness H1 of the main magnetic pole layer 24.

As a result, the sectional area of the main magnetic pole layer 24 at a cross section parallel to the opposing face H1a is smaller than the sectional area of the yoke layer 35 at another cross section parallel to the opposing face H1a in the back region.

Preferably, the main magnetic pole layer 24 is formed of a material which has a higher saturation magnetic flux density Bs than that of a material constituting the yoke layer 35.

Next, a lead layer 36 is formed on the bank layer 31 by plating using a conductive material such as copper, the lead layer 36 being magnetically coupled with the bank layer 31. The unnecessary portion of the plating base layer 35d in the vicinity of the yoke layer 35 and the lead layer 36 is removed by ion milling.

The yoke layer 35 and the lead layer 36 may be simultaneously formed using the same magnetic material.

Next, the protective layer 13 shown in FIG. 1 is formed. The opposing face H1a is polished to form a flush surface including the front face 21b of the auxiliary magnetic pole layer 21, the front face 33a of the insulating layer 33, and the front face 24a of the main magnetic pole layer 24.

The opposing face 11a of the slider 11 shown in FIG. 11 and the opposing face H1a of the perpendicular magnetic recording head Hv may be covered with an abrasion-resistant protective film composed of carbon such as diamond-like carbon (DLC), if necessary.

In the case of removing the plating base layer 24b before the formation of the yoke layer 35, deterioration of magnetic recording characteristics does not occur by forming the plating base layer 24b using a nonmagnetic material even if the plating base layer 24b other than the portion under the main magnetic pole layer 24 is not completely removed in the step shown in FIG. 22.

Figure 27:
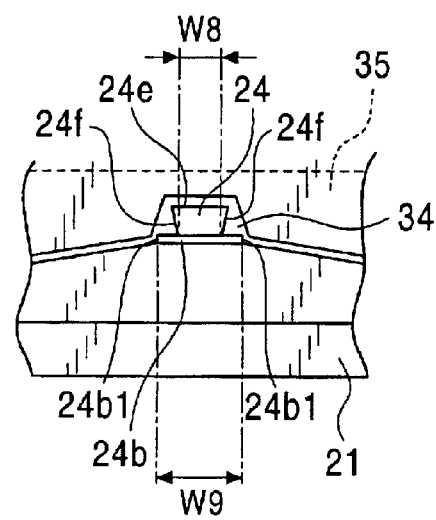
FIG. 27 is a partial front view illustrating another step o f making the perpendicular magnetic recording head.

Accordingly, the disorder of the track pattern recorded on the recording medium does not occur even when the side 24f of the main magnetic pole layer 24 and the side 24b1 of the plating base layer 24b form a continuous straight or curved side, for example, shown in FIG. 27, even when the width W8 of the bottom face 24k of the main magnetic pole layer 24 is larger than the width W9 of the plating base layer 24b in the track width direction.

When the plating base layer 24b other than the portion under the main magnetic pole layer 24 is completely removed after the step shown in FIG. 16, contaminants formed during removing the plating base layer 24b will adhere to the sides 24f of the main magnetic pole layer 24, or the sides 24f and the top face 24j will be etched. As a result, the width of the main magnetic pole layer 24 in the track width direction will vary.

In this embodiment, the resist layer 40 is annealed in the step shown in FIG. 12 to form slant sides 40b on the groove 40a. The slant sides 40b may be formed by another method. That is, the patterning precision is controlled by changing the exposure sensitivity of the material for the resist layer 40 to form a straight or curved sloping sides 40b of the groove 40a which has a top width which is larger than the bottom width by exposure and development.

In the step shown in FIG. 11, the groove 40a may be formed up to a position on the coupling layer 25 so that the main magnetic pole layer 24 is magnetically coupled with the coupling layer 25.

In FIG. 1, the top shield layer 51 and the auxiliary magnetic pole layer 21 may be integrated so that one magnetic layer functions as both an upper shield layer and an auxiliary magnetic pole layer.

In another embodiment, only the perpendicular magnetic recording head Hv is provided at the opposing face 11a at the trailing side of the slider 11, without providing the reading component $H_R$.

EXAMPLES

Figure 28:
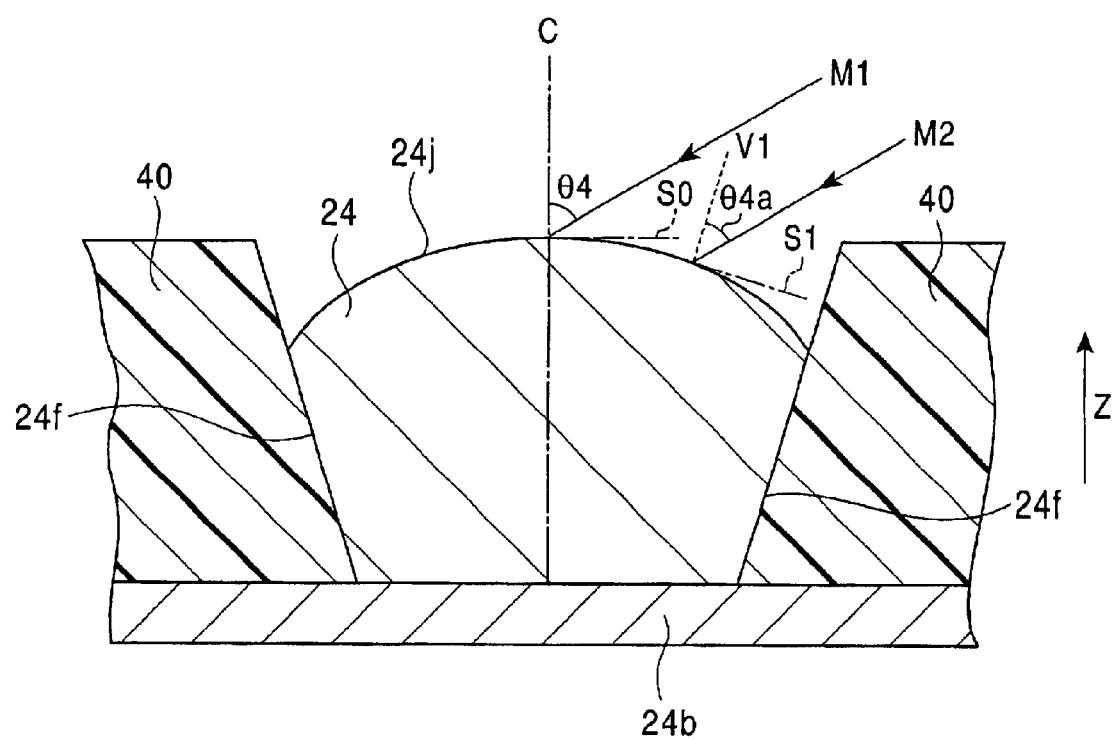
FIG. 28 is a transverse cross-sectional view of a main magnetic pole layer which is subjected to ion milling.

FIG. 28 is a partial cross-sectional view in the vicinity of the perpendicular magnetic recording head in the step shown in FIG. 13.

The main magnetic pole layer 24 is ion-milled by milling particles which are incident at a milling angle θ4 with respect to the perpendicular centerline C of the main magnetic pole layer 24.

Figure 29:
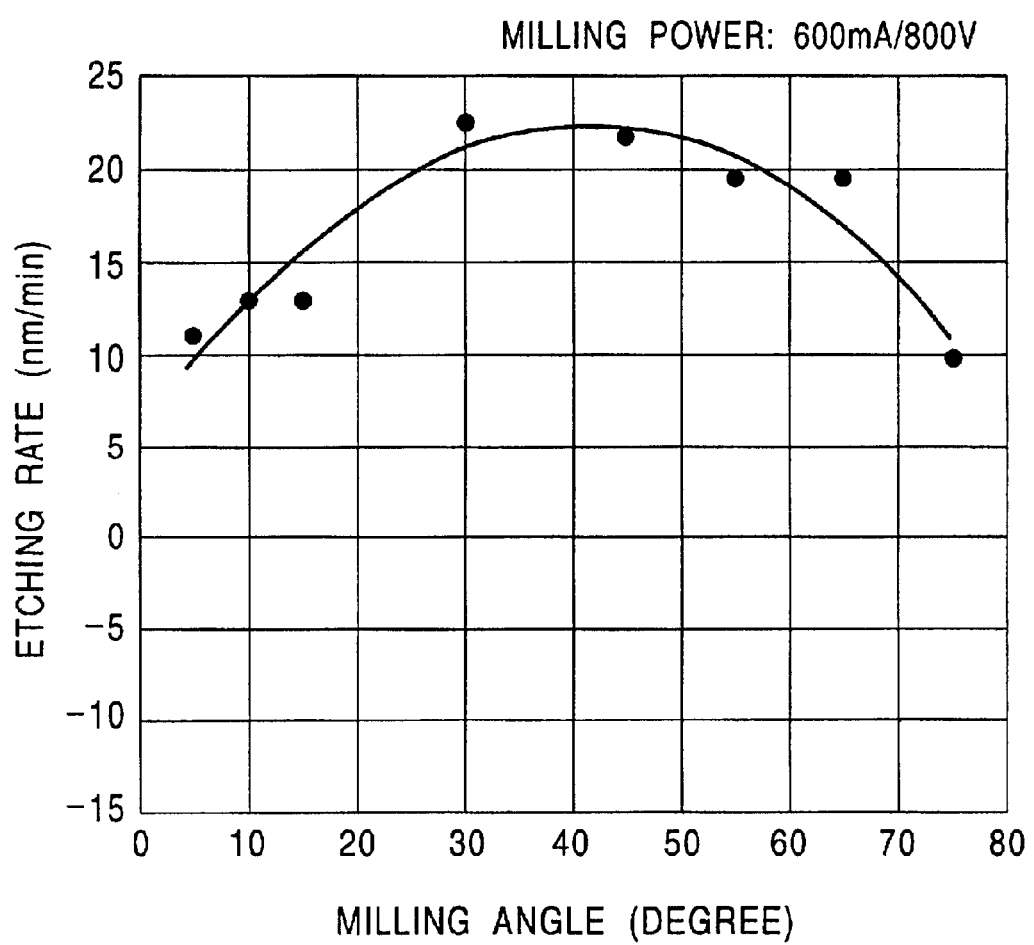
FIG. 29 is a graph illustrating the relationship between the milling angle of ion milling and the etching rate of the main magnetic pole layer.

FIG. 29 is a graph illustrating the relationship of the etching rate and the milling angle θ4.

Each point (•) indicates the observed etching rate of the main magnetic pole layer 24 in the thickness direction (Z direction in FIG. 28). FIG. 29 shows that the etching rate depends on the milling angle with respect to the perpendicular centerline C. The etching rate has a maximum at about 40° and decreases as the milling angle increases or decreases from 40°. At a milling angle of about 70°, the etching rate remarkably changes with a change in milling rate.

Since the top face 24j of the main magnetic pole layer 24 is convex, as shown in FIG. 28, the angle between the incident particles having the milling angle θ4 and the top face 24j differs at every point on the top face 24j in this anisotropic ion milling process.

For example, the angle between the normal (corresponding to the perpendicular centerline C) to the tangential plane S0 at a point P1 and the incident direction of the milling particle M1 are θ4. Similarly, the angle between the normal V1 to the tangential plane S1 at a point P2 is θ4a. Since θ4≠θ4a, the milling rate differs among different points on the top face 24j of the main magnetic pole layer 24.

Moreover, the distribution of the etching rates varies on the top face 24j as the ion milling proceeds; hence, the convex top face 24j gradually planarized and finally becomes planar, as shown in FIG. 14.

A significantly low milling rate causes less etching efficiency. Thus, the incident angle θ4 is preferably 80° or less and more preferably 70° or less.

On the other hand, a significantly high milling rate causes a large decrease in the volume of the main magnetic pole layer 24, resulting in deterioration of magnetic recording characteristics. Thus, the incident angle θ4 is preferably at least 45° and more preferably at least 60°.

As a result, an incident angle in the range of 60° to 70° results in a large rate of change in the etching rate with respect to the change in the incident angle θ4. Thus, a large difference in etching rate is achieved among the different points on the top face 24j, resulting in facilitated planarization.

Figure 30:
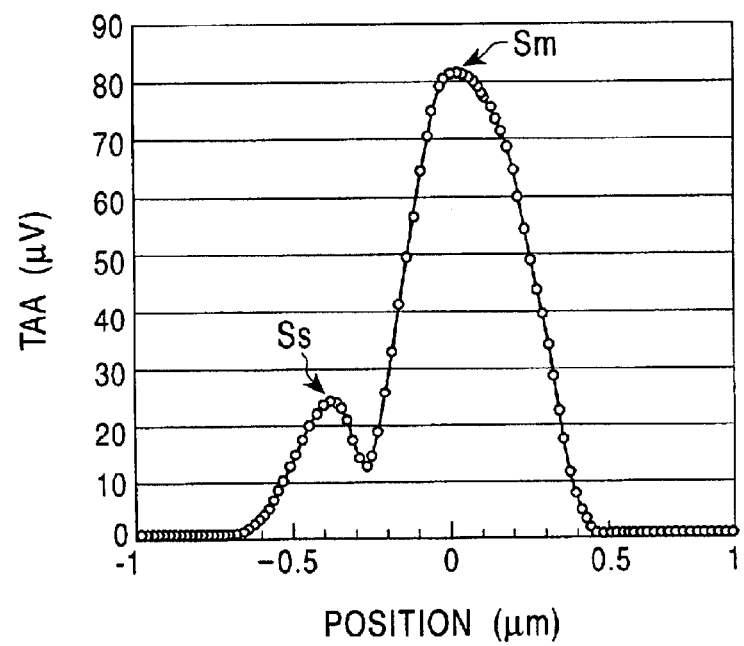
FIG. 30 is a graph of magnetic characteristics recorded on a perpendicular magnetic recording head in which a residual plating base layer composed of a magnetic material is present at a region not lying under a main magnetic pole layer.
Figure 31:
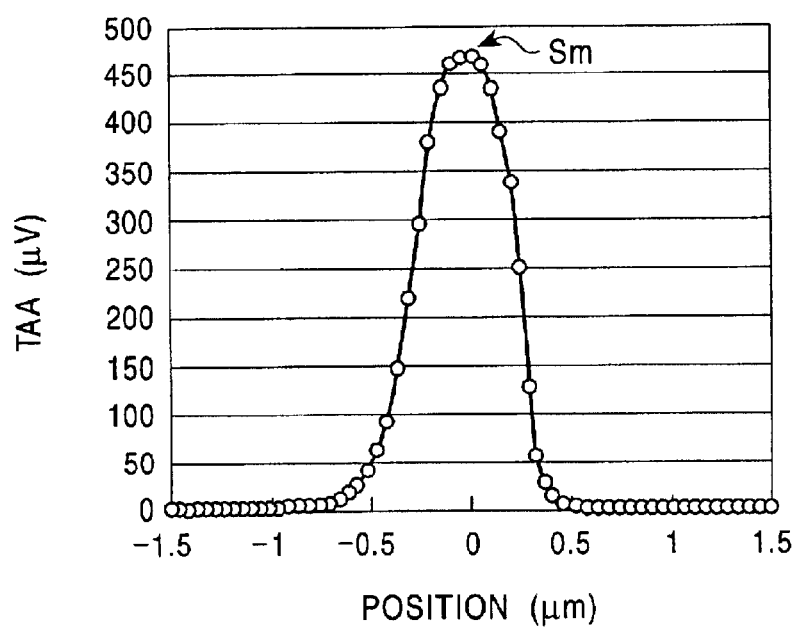
FIG. 31 is a graph of magnetic characteristics recorded on a perpendicular magnetic recording head in which a residual plating base layer composed of a nonmagnetic material is present at a region not lying under a main magnetic pole layer.
Figure 32:
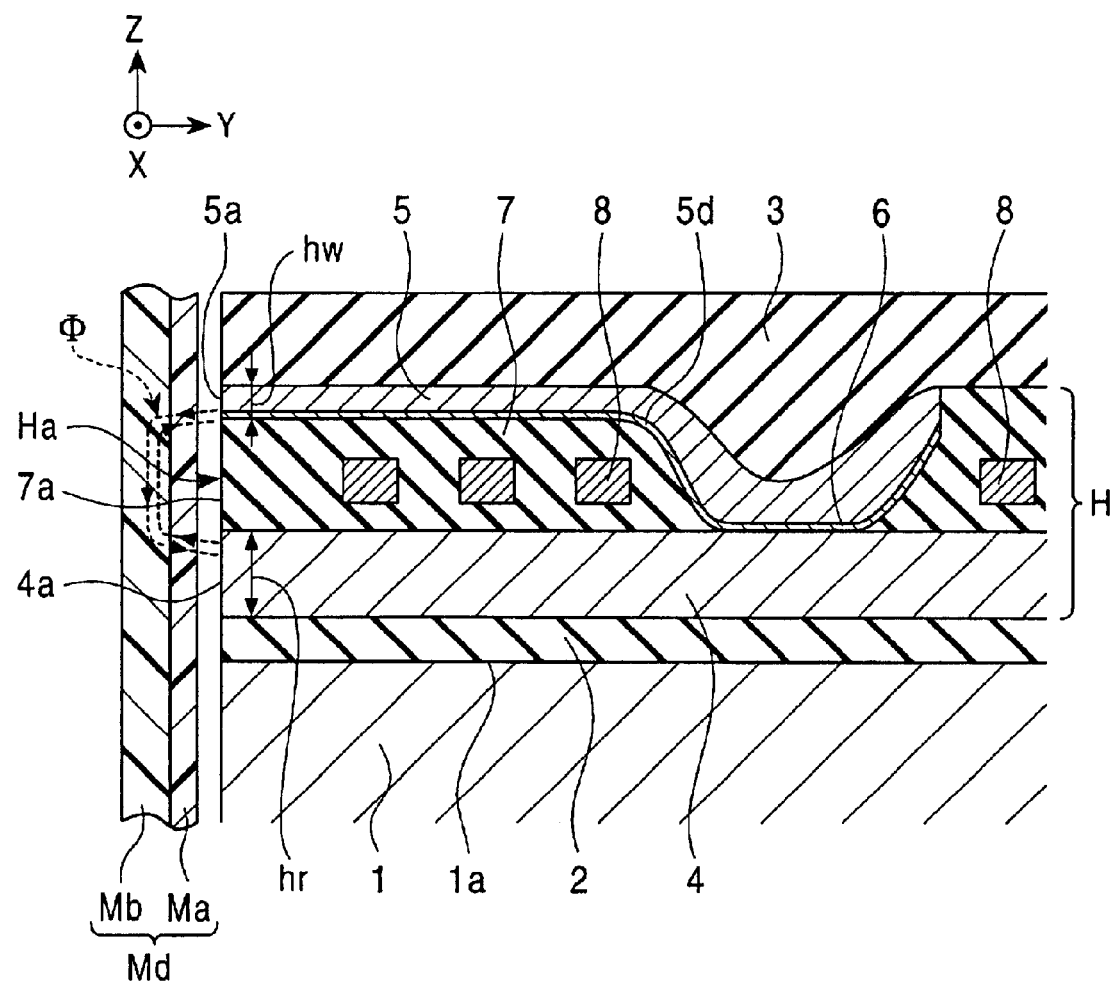
FIG. 32 is a cross-sectional view of a known perpendicular magnetic recording head.

FIGS. 30 and 31 are graphs illustrating magnetic characteristics of perpendicular magnetic recording heads made by the step shown in FIG. 21 or 22 and including a plating base layer 24b formed of a magnetic material and a nonmagnetic material, respectively, in which the plating base layer 24b is not completely removed in regions other than the main magnetic pole layer 24.

The magnetic recording characteristics are measured by a microtrack profile method in which a signal is recorded on a microtrack on a recording medium and a read element such as a magnetoresistive element scans on the microtrack in the track width direction to measure the intensity distribution of the signal read from the microtrack in the track width direction.

FIG. 30 shows that a side peak Ss, in addition to a main peak Sm, is observed in the recorded signal when the remaining magnetic plating base layer 24b is present in the regions other than the main magnetic pole layer 24. The side peak Ss is recorded by the remaining plating base layer 24b and is often observed when the perpendicular magnetic recording head has a skew angle.

FIG. 31 shows that only a main peak Sm is observed in the recorded signal despite the nonmagnetic plating base layer 24b remaining in the regions other than the main magnetic pole layer 24.

Accordingly, as shown in FIG. 22, the disorder of the track pattern recorded on the recording medium does not occur even when the side 24f of the main magnetic pole layer 24 and the side 24b1 of the plating base layer 24b do not form a continuous straight or curved side and specifically even when the width W8 of the bottom face 24k of the main magnetic pole layer 24 is larger than the width W9 of the plating base layer 24b in the track width direction.

The perpendicular magnetic recording head shown in FIG. 2 also does not cause the disorder of the track pattern recorded on the recording medium.

In conclusion, the perpendicular magnetic recording head including the plating base layer 24b composed of a nonmagnetic material is suitable for high-density recording.

According to the above-described method, the inverted trapezoidal front shape of the main magnetic pole layer prevents the protrusion of a side of the main magnetic pole layer from the recording track during recording on the recording medium even if the side of the main magnetic pole layer form a skew angle with respect to the normal to the recording medium, preventing fringing and improving the off-track performance.

Moreover, the planar opposing face of the main magnetic pole layer generates a linear magnetic domain boundary on the recording track. A definite recorded magnetic distribution is achieved at higher-density recording along the recording track, resulting in superior recording/retrieving characteristics.

Since the main magnetic pole layer surrounded by the resist layer is ion-milled, only the top face of the main magnetic pole layer is etched. The top face defines the track width Tw of the perpendicular magnetic recording head; hence, this milling process precisely defines the track width Tw.

What is claimed is:

1. A method for making a perpendicular magnetic recording head comprising the steps of:
   (a) forming an auxiliary magnetic pole layer on a first nonmagnetic insulating layer with a magnetic material;
   (b) forming a coupling layer on the auxiliary magnetic pole layer with a magnetic material behind an opposing face, opposing a recording medium, of the perpendicular magnetic recording head;
   (c) covering the first nonmagnetic insulating layer, the auxiliary magnetic pole layer, and the coupling layer with a second nonmagnetic insulating layer, and then forming a coil layer on the second nonmagnetic insulating layer in a region that does not include the coupling layer;
   (d) covering the second nonmagnetic insulating layer and the coil layer with an inorganic insulating layer, removing the second nonmagnetic insulating layer and the inorganic insulating layer on the coupling layer to expose the coupling layer and forming a plating base layer on the second nonmagnetic insulating layer over the inorganic insulating layer and the coupling layer;
   (e) forming a resist layer on the plating base layer, and forming a groove in the resist layer, the groove having a trimming pattern in a region in which a main magnetic pole layer is to be later such that an inner width of the groove in a track width direction gradually increases, from a bottom to a top of the resist layer,
   (f) forming the main magnetic pole layer in the groove by plating;
   (g) planarizing a top face of the main magnetic pole layer by milling in which milling particles enter at a tilt angle from a normal to the main magnetic pole layer;

(h) removing the resist layer: and (i) forming a yoke layer on the inorganic insulating layer, the yoke layer magnetically coupling the main magnetic pole layer with the coupling layer.

2. The method for making a perpendicular magnetic recording head according to claim 1, wherein said step (e) further comprises annealing the resist layer after forming the groove to deform the groove so that the width of the resist layer in the track width direction gradually increases from the bottom to the top of the resist layer.

3. The method for making a perpendicular magnetic recording head according to claim 1, wherein, in said step (e), a patterning precision of the resist layer is adjusted so that the width of the resist layer in the track width direction gradually increases from the bottom to the top of the resist layer.

4. The method for making a perpendicular magnetic recording head according to claim 1, wherein the tilt angle in said step (g) is in a range of 45° to 80°.

5. The method for making a perpendicular magnetic recording head according to claim 1, wherein the tilt angle in said step (g) is in a range of 60° to 70°.

6. The method for making a perpendicular magnetic recording head according to claim 1, further comprising the step (j), subsequent to said step (h), of removing the plating base layer in regions other than the main magnetic pole layer by ion milling in a direction which tilts by a predetermined angle from the normal to the main magnetic pole layer.

7. The method for making a perpendicular magnetic recording head according to claim 1, wherein the plating base layer is formed of a magnetic material in said step (d).

8. The method for making a perpendicular magnetic recording head according to claim 1, wherein the plating base layer is formed of a nonmagnetic material in said step (d).

9. The method for making a perpendicular magnetic recording head according to claim 6, wherein, in said step (d), the plating base layer is formed of a magnetic material, and, in said step (j), a width of the plating base layer in the track width direction is larger than a width of a bottom face of the main magnetic pole layer in the track width direction.

* * * * *

UNITED STATES PATENT AND TRADEMARK OFFICE
CERTIFICATE OF CORRECTION

PATENT NO. : 6,836,957 B2
DATED : January 4, 2005
INVENTOR(S) : Kiyoshi Kobayashi It is certified that error appears in the above-identified patent and that said Letters Patent is hereby corrected as shown below:

Title page,
Item [*] Notice, delete the phrase "by 294 days" and insert -- by 362 days --

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,836,957 B2  
DATED : January 4, 2005  
INVENTOR(S) : Kiyoshi Kobayashi It is certified that error appears in the above-identified patent and that said Letters Patent is hereby corrected as shown below:

Title page,
Item [56], References Cited, OTHER PUBLICATIONS, delete "Bain, J.;" (second occurrence)., delete "394737." and substitute -- 2000-394737. -- in its place.

Signed and Sealed this

Seventh Day of June, 2005

JON W. DUDAS
*Director of the United States Patent and Trademark Office*